US007010756B2

(12) United States Patent
Nagasaka et al.

(10) Patent No.: US 7,010,756 B2
(45) Date of Patent: Mar. 7, 2006

(54) DISPLAY OPERATING SYSTEM

(75) Inventors: Chikao Nagasaka, Aichi-ken (JP); Yasuhiro Fujioka, Aichi-ken (JP); Hiroshi Kishi, Aichi-ken (JP); Kouichi Masamura, Aichi-ken (JP)

(73) Assignee: Kabushiki Kaisha Tokai-Rika Denki-Seisakusho, Aichi-Ken (JP)

( * ) Notice: Subject to any disclaimer, the term of this patent is extended or adjusted under 35 U.S.C. 154(b) by 603 days.

(21) Appl. No.: 09/983,535

(22) Filed: Oct. 24, 2001

(65) Prior Publication Data
US 2002/0051014 A1   May 2, 2002

(30) Foreign Application Priority Data
Oct. 27, 2000 (JP) .............................. 2000-328790

(51) Int. Cl.
*G09G 5/00* (2006.01)
(52) U.S. Cl. ................ 715/810; 715/822; 715/823; 715/828; 715/767
(58) Field of Classification Search ............. 345/822, 345/823, 824, 828, 840, 158; 715/822, 823, 715/828, 767, 840
See application file for complete search history.

(56) References Cited
U.S. PATENT DOCUMENTS 5,598,523 A * 1/1997 Fujita ......................... 345/840
5,977,975 A * 11/1999 Mugura et al. ............. 345/822
6,061,097 A * 5/2000 Satterfield ..................... 725/44
6,094,196 A * 7/2000 Berry et al. ................. 345/852
6,137,487 A * 10/2000 Mantha ....................... 345/767
6,407,733 B1 * 6/2002 Kawakami .................. 345/204
6,614,457 B1 * 9/2003 Sanada et al. .............. 345/840

FOREIGN PATENT DOCUMENTS

| JP | 5-257592 | 10/1993 |
| JP | 10-228344 | 8/1998 |
| JP | 2000-235453 | 8/2000 |

OTHER PUBLICATIONS

*Notice of Reasons Rejected* dated Dec. 6, 2005 in corresponding Japanese Patent Application No. 2000-328790 (with full English translation).

* cited by examiner

*Primary Examiner*—Raymond J. Bayerl
*Assistant Examiner*—Ting Zhou
(74) *Attorney, Agent, or Firm*—Nixon Peabody LLP

(57) ABSTRACT

A display operating system which can freely set numbers of rows and columns in an arrangement of selection buttons displayed on a monitoring screen with immediate selection of a desired selection button being made possible. A position corresponding to that of a fingertip interrupting two of a plurality of light beams projected in a lattice on a panel of a controller at an intersection thereof is set as a first-touch position, on the basis of which an active area is established. This makes, of a plurality of selection buttons, selection buttons in the active area become selectable. Further, when the active area is changed by changing the first-touch position with a change in fingertip position to change light beams that are interrupted, selection buttons in the changed active area become selectable.

12 Claims, 18 Drawing Sheets

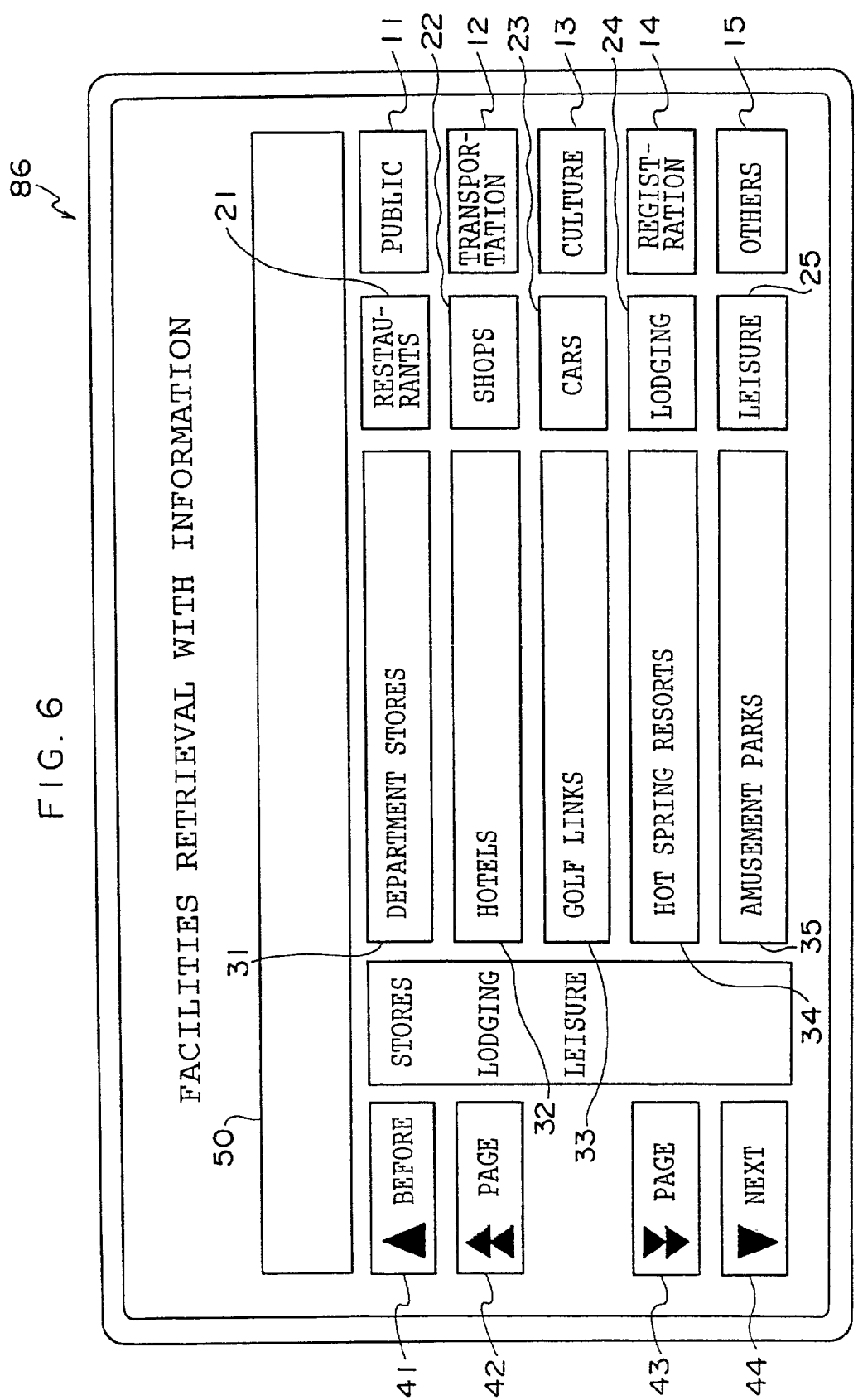

DISPLAY OPERATING SYSTEM

BACKGROUND OF THE INVENTION

1. Field of the Invention

The present invention relates to a display operating system used for providing a function for selecting any of a plurality of selection buttons displayed on a monitoring screen of a car navigation system mounted in a vehicle and the like.

2. Description of the Related Art

Recently, the variety of functions provided in a car navigation system mounted on a vehicle have been causing difficulties in providing operating buttons for the respective functions on a controller. Therefore, in such a multi-function car navigation system, a plurality of function selection buttons are displayed in a general form of a matrix on a monitoring screen. This provides a constitution in which one of a plurality of function selection buttons is selected for making a determination to realize a corresponding function.

For selecting any of a plurality of the function selection buttons displayed on a monitoring screen as above, several methods are provided. In one of the methods, operation buttons are provided in the form of a matrix on a controller side for selecting a function selection button displayed on a monitoring screen by pressing any of the operation buttons. In another method, a plurality of light beams are projected on a surface of a controller in a lattice. By interrupting the light beams at an intersection thereof and detecting the interrupted light beams, a function selection button is selected which is at a position corresponding to the intersection.

Meanwhile, there is also a method in which a lever-like stick or a sphere is provided on the controller side. By inclining the stick or rolling the sphere, a cursor displayed on a monitoring screen is moved, or displayed forms of the function selection buttons are changed successively in the inclined or rolled direction. When the cursor or changed display form reaches a function selection button selected, inclination of the stick or rolling of the sphere is stopped to make selection of the function selection button.

Incidentally, of the above-described methods of selecting the function selection button, each of the former two can be said as being constituted so as to provide a detection unit on the controller side. This, however, makes it impossible to select from the function selection buttons if the number of rows or the number of columns of the detection unit on the controller side is less than the number of rows or the number of columns displayed on the monitoring screen. Therefore, a limitation is imposed in that the number of rows and the number of columns displayed on the monitoring screen can not be more than the number of rows and the number of columns of the detection unit on the controller side. Hence, when an increase in the number of rows or the number of columns of the function selection buttons is required, the design of the controller must be changed. This causes an increase in the development cost of the system and, along with this, requires user side to familiarize with a newly developed controller.

Compared with this, in the latter of the above-described methods of selecting the function selection button, although it does not cause inconvenience as in the above former two, when there are a number of function selection buttons between the cursor or a function selection button with changed display form and the desired function selection button, a problem occurs in that it takes a long time until the cursor or function selection button with changed display form reaches the desired function selection button.

SUMMARY OF THE INVENTION

In view of the foregoing, it is an object of the present invention to obtain a display operating system in which a number of rows and number of columns of selection elements, such as function selection buttons displayed on a monitoring section such as a monitoring screen, can be freely determined and a desired selection element can be immediately selected.

In order to achieve the above object, a display operating system according to a first aspect of the present invention comprising: a detecting section for detecting a position of an operating body on an operating plane; an inputting section for inputting one of a position detection signal and a determined candidate selection signal, the inputting section being provided with the detecting section, and the position detection signal corresponding to a position of the operating body on the operating plane detected by the detecting section, and the determined candidate selection signal corresponding to a position of the operating body on the operating plane detected by the detecting section; a monitoring section for displaying a plurality of selection elements displayed on a screen provided thereat; and a controlling section for controlling such that, of the plurality of selection elements displayed on the screen of the monitoring section, at least one selection element at a position corresponding to the position of the operating body on the operating plane is set to a selectable state on the basis of the received position detection signal, and, of the at least one selection element in the selectable state, a selection element at a position corresponding to the position of the operating body on the operating plane is set to a determined candidate on the basis of the determined candidate selection signal.

According to the first aspect of the present invention, the plurality of selection elements (buttons) are displayed on a screen of the monitoring section. When the operating body is positioned at any position on the operating plane provided in the inputting section, the position of the operating body is detected by the detecting section. In this state, when the position detection signal from the inputting section is directly or indirectly inputted to and received by the controlling section, of the plurality of selection elements displayed on the screen of the monitoring section, at least one selection element (preferably, a plurality of selection elements within a range) at a position corresponding to the position of the operating body on the operating plane of the monitoring section is set to the selectable state by the controlling section.

Following this, in this state, when the controlling section receives a signal which is different from the position detection due to the position of the operating body being changed on the operating plane (that is, when the controlling section directly or indirectly receives the determined candidate selection signal from the inputting section), of the above-described selection elements in the selectable state, a selection element at a position corresponding to the position of the operating body on the operating plane is made a determined candidate. Further, by performing confirmation with respect to this selection element which is made to be the determined candidate, by a specified operation, a function is selected which corresponds to the display on the selection element of the determined candidate, for example, and then a processing corresponding to this function is carried out.

Alternatively, when the position of the operating body is unchanged from the position at a time of inputting of the position detection signal, by performing conformation with respect to this selection element, which is made to be the determined candidate, by the specified operation, a function is selected which corresponds to the display on the selection element of the determined candidate, for example, and then a processing corresponding to this function is carried out.

In this way, after at least one selection element of a plurality of selection elements is made in a selectable state on the basis of a position detection signal, on the basis of a determined candidate selection signal, from the selection element(s) which is (are) set to the selectable state, a desired selection element is selected. Therefore, even if the detection precision (resolution) of the detecting section is not in correspondence with an arrangement of the selection elements displayed on the monitoring section, a desired selection element can be selected by the inputting section.

In a display operating system according to a second aspect of the present invention, if, between a time of reception of the position detection signal and a time of reception of the determined candidate selection signal, the controlling section receives a different position detection signal satisfying a specified condition, a different at least one selection element, which is different from the at least one selection element, is set to the selectable state by the controlling section, the different at least one selection element corresponding to new position of the operating body on the operating plane.

In the display operating system of the second aspect constituted as above, by the controlling section directly or indirectly receiving a position detection signal from the inputting section, at least one selection element (selection elements) at a position corresponding to a position of the operating body on the operating plane becomes selectable on the basis of the received position detection signal. If the controlling section receives the different position detection signal satisfying the specified condition in a time from the at least one selection element becoming selectable till direct or indirect reception of the determined candidate selection signal by the controlling section, on the basis of the different position detection signal, a new at least one selection element (new selection elements), which is different from the previous at least one, is made in a selectable state on the basis of the different position detection signal.

This makes it possible to change the selectable region without any complicated operation, to thereby improve operability.

In addition, "specified condition" in "position detection signal satisfying a specified condition" defined in the present aspect is not limited to specific contents of a condition which can distinguish the position detection signal as being different from a position detection signal for putting any one of the plurality of selection elements into a selectable state as a determined candidate. For example, a time, such as a time duration from the first reception of a position detection signal to reception of a new position detection signal, or a time duration of continuing reception of a position detection signal corresponding to a specified position of the operating plane (that is, a time during which the operating body is positioned at the specified position on the operating plane (does not move)), can be the "specific condition" defined in the present aspect. Moreover, a direction or a position can also be the "specific condition", which is such as a direction from a position of a selection element corresponding to an initial position detection signal to a position of a selection element corresponding to a new position detection signal, or a specified position on an operating screen which corresponds to an initial position detection signal or a new position detection signal. Furthermore, a case can also be the "specific condition" defined in the present aspect in which, immediately before receiving a new position detection signal, the controlling section directly or indirectly received a different signal with a kind or a form thereof different from that of a position detection signal or a determined candidate selection signal.

Also, in a display operating system according to a third aspect of the present invention, if, after one of the position detection signal and the determined candidate selection signal has been received, detection of a position of the operating body by the detecting section is canceled, the controlling section maintains a state consequent to the one of the position detection signal and the determined candidate selection signal that has been received and, if a position at which the detecting section next detects the operating body is substantially the same as the position of the operating body before the detection of the position of the operating body by the detecting section was cancelled, the controlling section continues processing from the state consequent to the one of the position detection signal and the determined candidate selection signal that was received.

In the display operating system of the third aspect constituted as above, if the detection of a position of the operating body by the detecting section is canceled after the controlling section has directly or indirectly received one of the position detection signal and the determined candidate selection signal, a state after reception of the one of the position detection signal and the determined candidate selection signal is maintained by the controlling section.

Furthermore, in this state, when the detecting section detects the operating body at a position substantially the same as the position of the operating body before the cancellation of the previous detection of the position of the operating body, the controlling section starts to continue processing from the above state after the reception of the one of the position detection signal and the determined candidate selection signal. Thus, even if an operating body such as a fingertip is accidentally moved off a detection region, it is unnecessary to start an operation from the beginning again. Moreover, even if confusion occurs during operation, the operating body can be once moved off the detection region without being kept rested therein, for restarting subsequent operation after the confusion is cleared. Therefore, it is again unnecessary to start an operation from the beginning again, to thereby improve operability.

In a display operating system according to a fourth aspect of the present invention, the display operating system comprises: a detecting section for detecting a position of an operating body on an operating plane, the operating plane including a plurality of detection positions structured of a predetermined number of rows and a predetermined number of columns; an inputting section for inputting one of a position detection signal and a determined candidate selection signal, the inputting section being provided with the detecting section, and the position detection signal corresponding to a first position of the operating body on the operating plane detected by the detecting section, and the determined candidate selection signal corresponding to a second position of the operating body on the operating plane detected by the detecting section; a monitoring section for displaying a plurality of selection elements displayed on a screen provided thereat, the plurality of selection elements being structured of at least as many rows as the predetermined number of rows and at least as many columns as the predetermined number of columns; and a controlling section for controlling such that, of the plurality of selection elements displayed on the screen of the monitoring section, at least one selection element at a position corresponding to the first position of the operating body on the operating plane is set to a selectable state on the basis of the received position detection signal, and, of the at least one selection element in the selectable state, a selection element at a position corresponding to the second position of the operating body on the operating plane is set to a determined candidate on the basis of the determined candidate selection signal.

In a display operating system according to a fifth aspect of the present invention, of the plurality of selection elements displayed on the screen of the monitoring section, the controlling section sets selection elements, which are structured of a number of rows equal to the predetermined number of rows and a number of columns equal to the predetermined number of columns, to the selectable state on the basis of the received position detection signal.

In a display operating system according to a sixth aspect of the present invention, after the selection elements which are structured of the numbers of row equal to the predetermined number of rows and the number of columns equal to the predetermined number of columns have been set to the selectable state, the controlling section sets one of the selection elements that have been set to the selectable state as the determined candidate on the basis of the determined candidate selection signal.

In a display operating system according to a seventh aspect of the present invention, wherein, if the selection element at the position corresponding to the second position of the operating body on the operating plane is adjacent to a selection element other than the at least one selection element set to the selectable state and a predetermined condition is satisfied, then the controlling section sets different at least one selection element to the selectable state.

In a display operating system according to an eighth aspect of the present invention, the predetermined condition is that the operating body is detected at the second position on the operating plane for at least a predetermined duration.

In a display operating system according to a ninth aspect of the present invention, if, after one of the position detection signal and the determined candidate selection signal has been received, detection of a position of the operating body by the detecting section is canceled, the controlling section maintains the at least one selection element in the selectable state until the operating body is next detected by the detecting section.

In a display operating system according to a tenth aspect of the present invention, if, after the detection of a position of the operating body by the detecting section has been canceled, a position at which the operating body is next detected by the detecting section is substantially the same as the position of the operating body before the detection of the position of the operating body by the detecting section was cancelled, the controlling section maintains the at least one selection element in the selectable state.

BRIEF DESCRIPTION OF THE DRAWINGS

FIG. 6 is a front view showing a monitoring unit (a monitoring television) with a plurality of selection elements being displayed on a screen;

DESCRIPTION OF THE PREFERRED EMBODIMENTS

Preferred embodiments of the present invention will be explained in detail below.

First Embodiment

Figure 1:
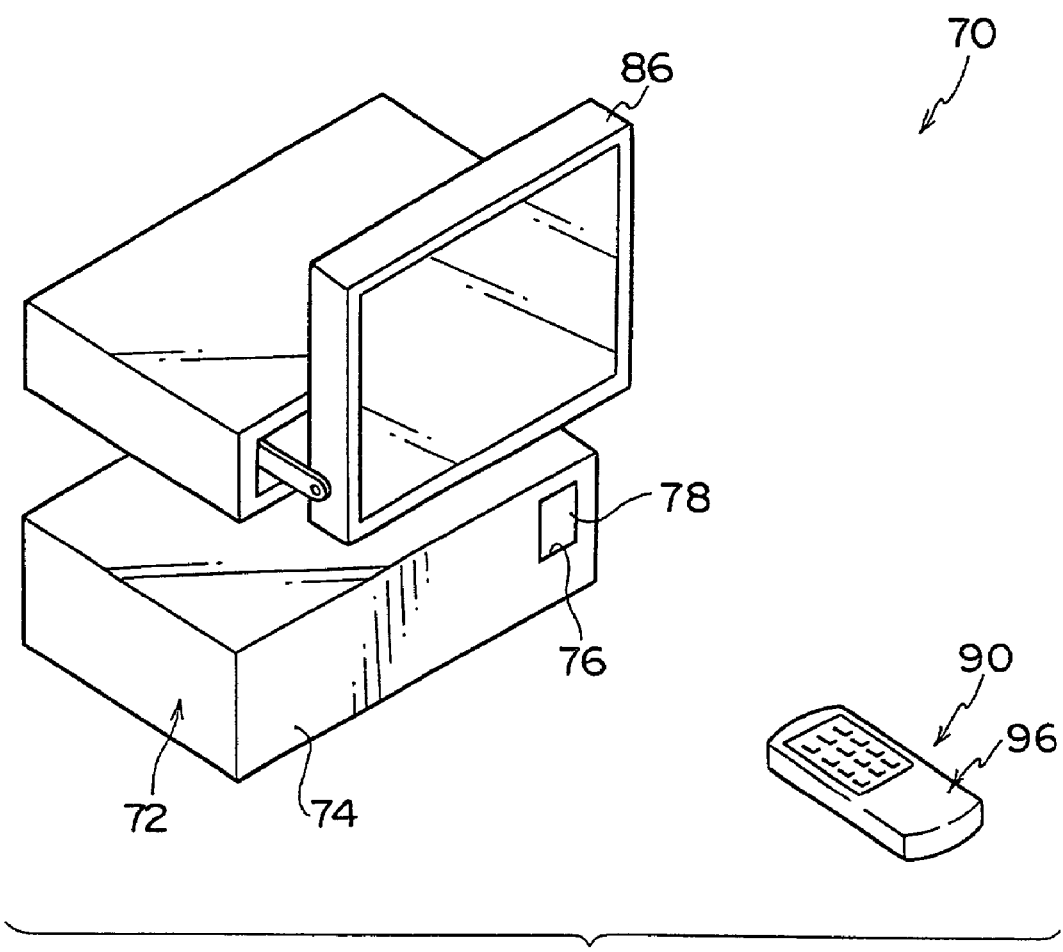
FIG. 1 is a perspective view showing a constitution of a car navigation system having a display operating system according to a first embodiment of the present invention as a part of function thereof.
Figure 2:
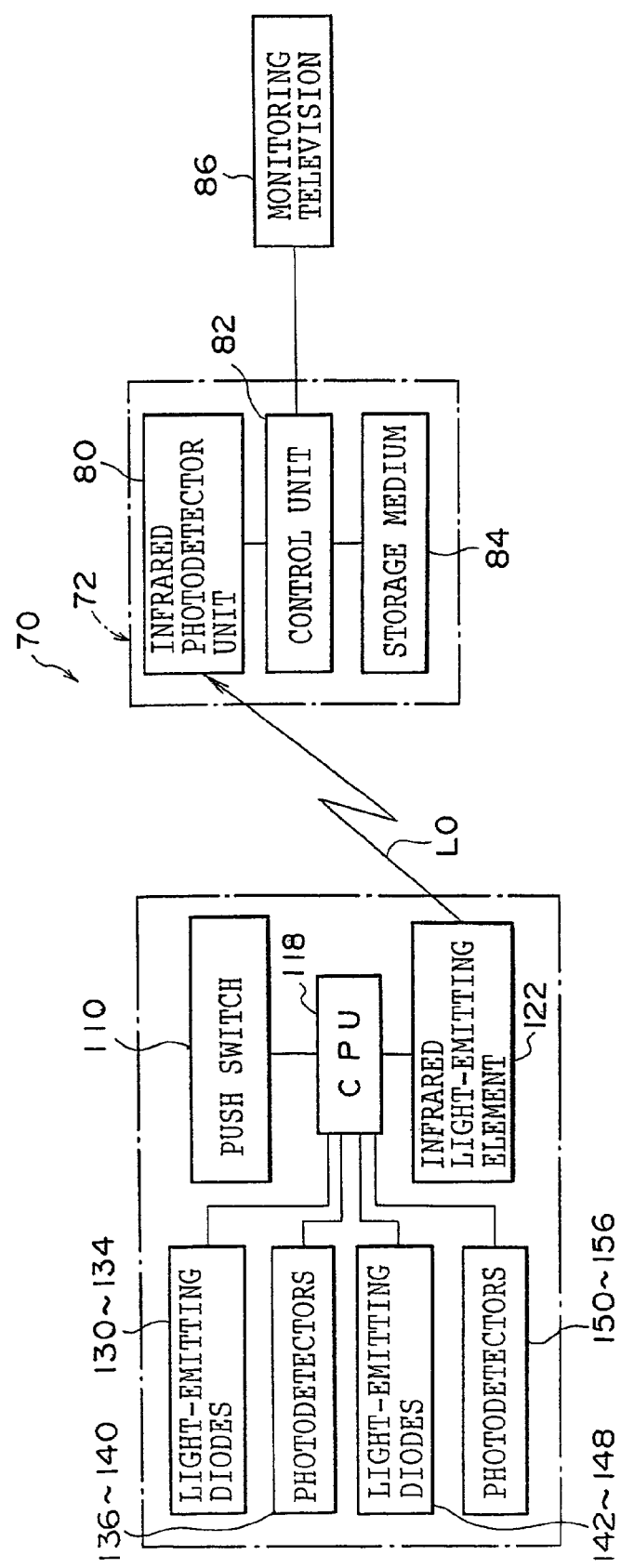
FIG. 2 is a block diagram schematically showing a configuration of the car navigation system having the display operating system according to the first embodiment of the present invention as a part of function thereof.

In FIG. 1, there is perspectively shown a schematic external view of a car navigation system 70 as a display operating system according to the first embodiment of the present invention (to be more exact, a car navigation system 70 having a display operating system according to the first embodiment of the present invention as a part of the functions thereof). In FIG. 2, there is shown a block diagram showing a configuration of the car navigation system 70.

As shown in the above figures, the car navigation system 70 is provided with a main body 72. As shown in FIG. 1, the main body 72 is formed in a box-like form as a whole to be held in a holder (not shown) formed in an instrument panel of a vehicle. On an outer wall 74 of the main body 72, which is exposed inside a passenger cab with the main body 72 being held in the holder, there is formed an opening portion 76 (a window 76). To the window 76, there is fitted a window material 78 which is colorless transparent or colored so as to allow transmission of an infrared light beam. Inside the main body 72, there is provided an infrared ray receiving section 80 (an infrared light photodetector unit 80) shown in FIG. 2 for receiving an infrared light beam transmitted through the window 76.

As shown in FIG. 2, the infrared light photodetector unit 80 is connected to a control unit 82, a controlling unit, such as a CPU provided inside the main body 72 and transmits an electric signal corresponding to a received infrared light signal to the control unit 82. The control unit 82 is further connected to a storage medium 84 provided inside or outside of the main body 72 (in the embodiment, inside the main body 72) for reading various programs stored in the storage medium 84 to process and execute the programs.

As shown in FIG. 1, the car navigation system 70 is provided with a monitoring television 86 as a monitoring unit. The monitoring television 86 is mounted on a specified setting location, which may be the instrument panel, of the vehicle so that a driver can watch a screen from a driver's seat, for example. The monitoring television 86 is directly or indirectly connected to the control unit 82 in the main body 72 through a connecting unit such as a flat cable, and displays processed or executed results. In particular, when the control unit 82 reads a retrieval program from the storage medium 84, a retrieval screen image is displayed on the screen of the monitoring television 86 as shown in FIG. 6. In the retrieval screen image, selection buttons 11 to 15, 21 to 25, 31 to 35, and 41 to 44 (selection elements), apparently disposed in a matrix of five rows and four columns, are displayed, and along with this, a retrieved result display section 50 (a retrieved result presentation box 50) is displayed.

Figure 3:
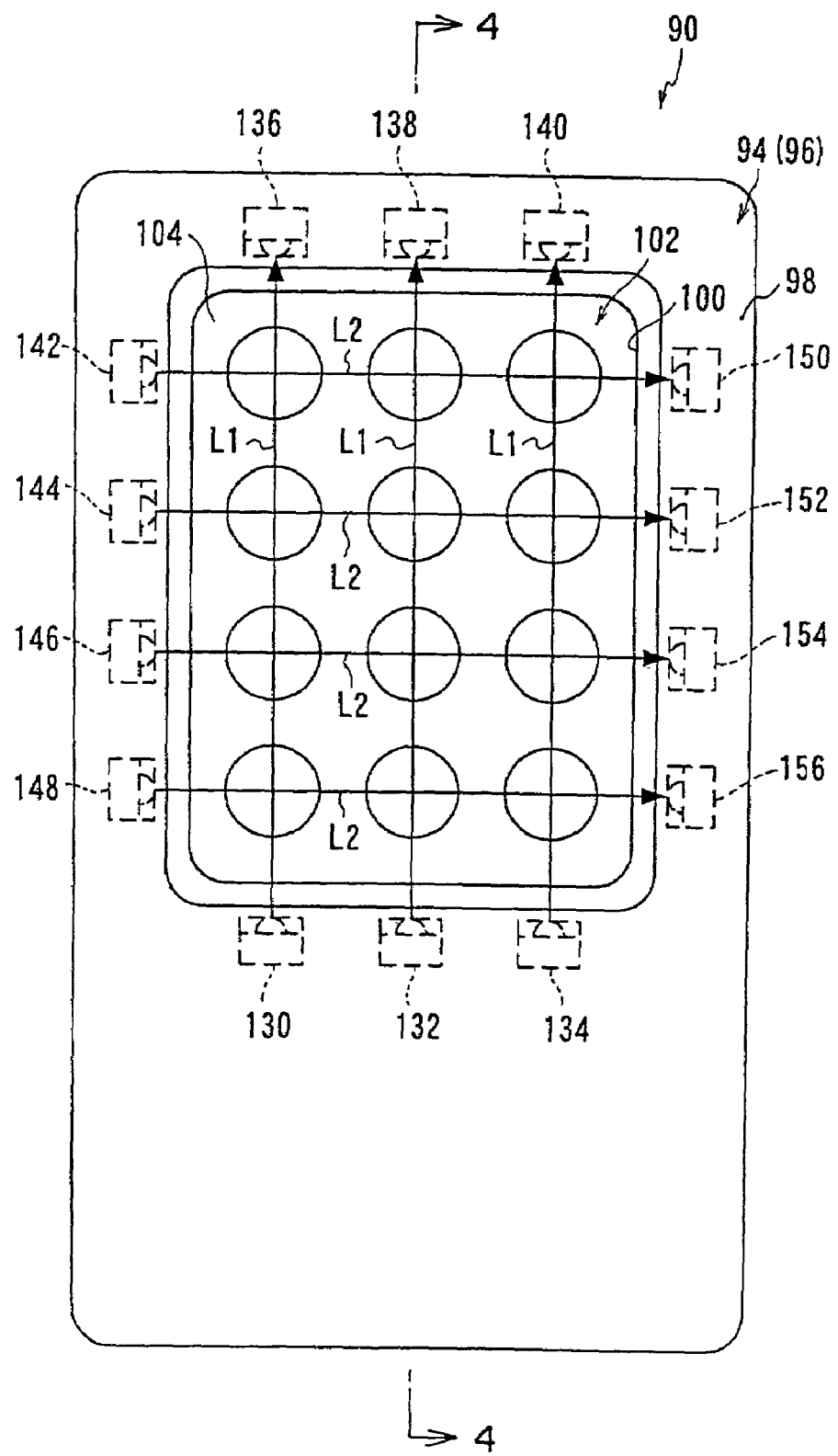
FIG. 3 is a plan view showing a controller of the display operating system according to the first embodiment of the present invention.

Moreover, as shown in FIG. 1, the car navigation system 70 is provided with a controller 90 as an inputting unit. Here, a constitution of the controller 90 is shown in FIG. 3 in a plan view, and in FIG. 4 in a partial cross sectional view taken along line 4—4 in FIG. 3.

Figure 4:
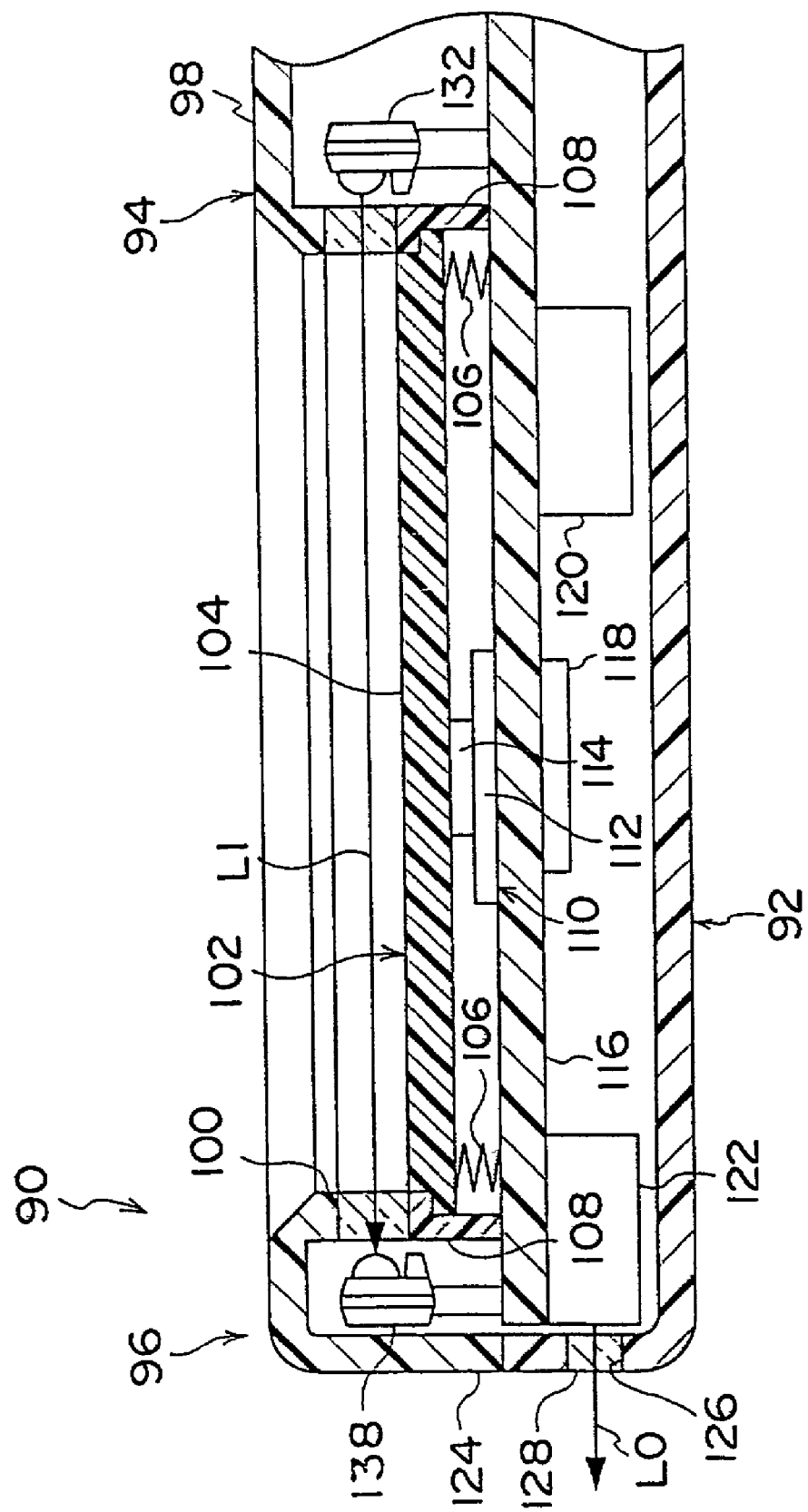
FIG. 4 is a partial cross sectional view taken along line 4—4 of FIG. 3 schematically showing the constitution of the controller of the display operating system according to the first embodiment of the present invention.

As shown in FIG. 4, the controller 90 is provided with a case 96 constituted of a lower case 92 and an upper case 94. The lower case 92 is formed approximately in a box-like form and opens in one of thickness directions. The upper case 94 is formed approximately in a box-like form and opens in the other of thickness directions (a direction opposite to the lower case 92). The lower case 92 and the upper case 94 are combined into one with the opened ends facing each other.

In an upper base 98 of the upper case 94, there is provided an approximately rectangular shaped opening 100. At a location in the case 96 corresponding to a location of the opening 100, there is provided a panel 104 as an operating plane constituting a panel switch 102. The panel 104 has a rim formed approximately in a shape of a rectangular plane corresponding to the shape of the opening 100.

Furthermore, as shown in FIG. 4, under the panel 104 (the lower case 92 side), a circuit board 116 is provided approximately in parallel with the panel 104. On at least one of top and bottom faces of the circuit board 116, there is provided wiring such as printed wiring. A CPU 118, a battery 120, and further electronic parts such as resistors and capacitors are provided thereon and are electrically connected by the wiring. The circuit board 116 is directly or indirectly secured to the upper case 94 or the lower case 92 by a securing unit not shown. In addition, on the circuit board 116, there are provided compressed coil springs 106, which support the panel 104 so that the panel 104 is movable for being made contacted to and separated from the circuit board 116, with a spring force being exerted on the panel 104 toward the opening 100 side. Moreover, the circuit board 116 is provided with stopper 108, which engages with the rim of the panel 104 to hold the panel 104 so that the panel 104 is not moved from the circuit board 116 more than a specified distance.

Between the panel 104 and the circuit board 116, there is provided a push switch 110 that constitutes the panel switch 102 together with the panel 104. The push switch 110 is provided with a main part 112. The main part 112 is provided with a fixed contact not shown. The fixed contact is electrically connected to the wiring of the circuit board 116. Further, the main part 112 is provided with a movable part 114. The movable part 114 is made movable with respect to the main part 112 approximately in the same directions in which the panel 104 is made contacted to and separated from the circuit board 116. When moving in a direction to approach the circuit board 116, at least a portion of the movable part 114 moves into the main part 112. The movable part 114 is provided with a movable contact (not shown) which contacts with the fixed contact of the main part 112 to provide electric continuity when the movable part 114 moves in the direction to approach the circuit board 116, and the continuity between the fixed contact and the movable contact is cancelled when the movable part 114 moves in a direction to be away from the circuit board 116.

The movable part 114 abuts on the back face of the panel 104 with the side opposite to the main part 112. (An upper side of the movable part 114 opposite to the main part 112 abuts on the back face of the panel 104.) Therefore, a constitution is provided in which, with the panel 104 moved in the direction to approach the circuit board 116 against the force exerted by the compressed coil spring 106, the movable part 114 approaches the circuit board 116 to bring the movable contact of the movable part 114 to contact with the fixed contact in the main part 112.

Furthermore, near the rim on the bottom face of the circuit board 116, there is provided an infrared light-emitting element 122. The infrared light-emitting element 122 is electrically connected to the above described CPU 118 and the battery 120 to emit an infrared light signal L0 on the basis of the signal from the CPU 118. At a position on a side wall 124 of the lower case 92, corresponding to a position of the infrared light-emitting element 122, there is formed an opening portion 126 (a window 126). To the window 126, there is fitted a window material 128 which is transparent or colored such that transmission of an infrared light beam is possible. The infrared light signal L0 emitted at the infrared light-emitting element 122 passes through the window material 128 to be transmitted to the outside and further passes through the window material 78 of the main body 72 to be received by the infrared light photodetector unit 80.

Meanwhile, as shown in FIG. 3, at a side of one end in a longitudinal direction of the panel 104 and at a back side of the upper base 98, a plurality of (three in the embodiment) light-emitting diodes 130, 132, and 134 are provided as detecting units. The light-emitting diodes 130, 132, and 134 are arranged at specified intervals along the one end of the panel 104. A light beam L1 emitted from each of the light-emitting diodes 130, 132, and 134 passes on (above) the panel 104 in parallel with the surface of the panel 104 and with other light beams L1.

As shown in FIG. 4, the light-emitting diodes 130, 132, and 134 are coupled to the circuit board 116 and electrically connected to the battery 120 and the CPU 118 through the wiring provided on the circuit board 116. The light beams L1 are emitted on the basis of a signal from the CPU 118.

Also as shown in FIG. 3, at a side of the other end in the longitudinal direction of the panel 104 (namely, the other end is opposite to the end where the light-emitting diodes 130, 132, and 134 are provided) and at the back side of the upper base 98, a plurality of (three in the embodiment) light-receiving elements (photodetectors) 136, 138, and 140 are provided as detecting units. The photodetectors 136, 138, and 140 are provided corresponding to the above-described light-emitting diodes 130, 132, and 134, and receive the light beams L1 emitted from the light-emitting diodes 130, 132, and 134, respectively.

As shown in FIG. 4, each of the photodetectors 136, 138, and 140 is coupled to the circuit board 116 and electrically connected to the battery 120 and the CPU 118 through the wiring provided on the circuit board 116 to transmit information as to whether the light beam L1 is received or not, as an electric signal, to the CPU 118.

Meanwhile, as shown in FIG. 3, at a side of one lateral end in a width direction of the panel 104 and at the back side of the upper base 98, a plurality of (four in the embodiment) light-emitting diodes 142, 144, 146, and 148 are provided as detecting units. The light-emitting diodes 142, 144, 146, and 148 are arranged at specified intervals along the one lateral end of the panel 104. A light beam L2 emitted from each of the light-emitting diodes 142, 144, 146, and 148 passes on (above) the panel 104 in parallel with the surface of the panel 104 and with other light beams L2.

Also, the light-emitting diodes 142, 144, 146, and 148 are coupled to the circuit board 116 and electrically connected to the battery 120 and the CPU 118 through the wiring provided on the circuit board 116. The light beams L2 are emitted on the basis of a signal from the CPU 118. (That is, in the embodiment, the light beams L1 and L2 pass over the panel 104 in three rows and four columns.)

On the other hand, at a side of the other end in the width direction of the panel 104 (that is, the other end is opposite to the end where the light-emitting diodes 142, 144, 146, and 148 are provided) and at the back side of the upper base 98, a plurality of (four in the embodiment) light-receiving elements (photodetectors) 150, 152, 154, and 156 are provided as detecting units. The photodetectors 150, 152, 154, and 156 are provided corresponding to the above-described light-emitting diodes 142, 144, 146, and 148, and receive the light beams L2 emitted from the light-emitting diodes 142, 144, 146, and 148, respectively.

Moreover, each of the photodetectors 150, 152, 154, and 156 is coupled to the circuit board 116 and electrically connected to the battery 120 and the CPU 118 through the wiring provided on the circuit board 116 to transmit information as to whether the light beam L2 is received or not, as an electric signal, to the CPU 118.

Next, prior to an overall explanation of operation and effects of this embodiment, an operation of the controller 90 will be simply explained.

In the controller 90, when the battery 120 is brought into a state of supplying power, the light beam L1 is emitted from each of the light-emitting diodes 130, 132, and 134. Along with this, the light beam L2 is emitted from each of the light-emitting diodes 142, 144, 146, and 148. The light beams L1 emitted from the light-emitting diodes 130, 132, and 134 and the light beams L2 emitted from the light-emitting diodes 142, 144, 146, and 148 form a matrix. Each of the light beams L1 emitted from the light-emitting diodes 130, 132, and 134 reaches the corresponding photodetector 136, 138, or 140, and is received thereby unless interrupted. In the same way, each of the light beams L2 emitted from the light-emitting diodes 142, 144, 146, and 148 reaches the corresponding photodetectors 150, 152, 154 and 156 and is received thereby unless interrupted.

When a fingertip, as an operating body, touches the surface of the panel 104 with the light beams L1 being emitted from the light-emitting diodes 130, 132, and 134 and the light beams L2 being emitted from the light-emitting diodes 142, 144, 146, and 148, at a portion at which the fingertip touches on the surface of the panel 104, a light beam L1 and a light beam L2 corresponding to the portion are interrupted by the fingertip. Thus, the light beam L1 does not reach one of the photodetectors 136, 138, and 140 corresponding to the interrupted light beam L1. Similarly, the light beam L2 does not reach one of the photodetectors 150, 152, 154, and 156 corresponding to the interrupted light beam L2. Furthermore, the CPU 118 receives interruption signals from the one of the photodetectors 136, 138, and 140 to which no light beam L1 reaches, and the one of the photodetectors 150, 152, 154, and 156 to which no light beam L2 reaches. The CPU 118 then makes the infrared light-emitting element 122 emit (transmit) therefrom an infrared light signal L0 based on the interruption signals. (L0 is emitted from the infrared light-emitting element 122.)

In this state, when the panel 104 is pushed to shift toward the lower case 92 against the force exerted by the compressed coil springs 106, the movable part 114 of the push switch 110 shifts toward the circuit board 116 due to being pressed by the panel 104. This makes the movable contact of the movable part 114 and the fixed contact of the main part 112 contact with each other to provide continuity. The continuity between the movable contact of the movable part 114 and the fixed contact of the main part 112 is detected by the CPU 118 electrically connected to the fixed contact. On detecting the continuity between the movable contact of the movable part 114 and the fixed contact of the main part 112, the CPU 118 makes the infrared light-emitting element 122 emit (transmit) therefrom an infrared light signal L0 based on a continuity signal informing the continuity between the movable contact of the movable part 114 and the fixed contact of the main part 112.

The infrared light signal L0 thus transmitted from the infrared light-emitting element 122 is received by the infrared light photodetector unit 80 in the main body 72. Further, an electric signal corresponding to the infrared light signal L0 received by the infrared light photodetector unit 80 is received by the control unit 82. Incidentally, for convenience, the electric signal corresponding to the infrared light signal L0 based on interruption of the light beams L1 and L2 is hereinafter referred to as an "interruption signal", and the electric signal corresponding to the infrared light signal L0 based on pushing of the push switch 110 is hereinafter referred to as a "determination signal"

Now, an operation of the car navigation system 70, which is started by the control unit 82 reading a function selecting and inputting program stored in the storage medium 84, will be explained with reference to a flowchart shown in FIGS. 5A and 5B.

Figure 5A:
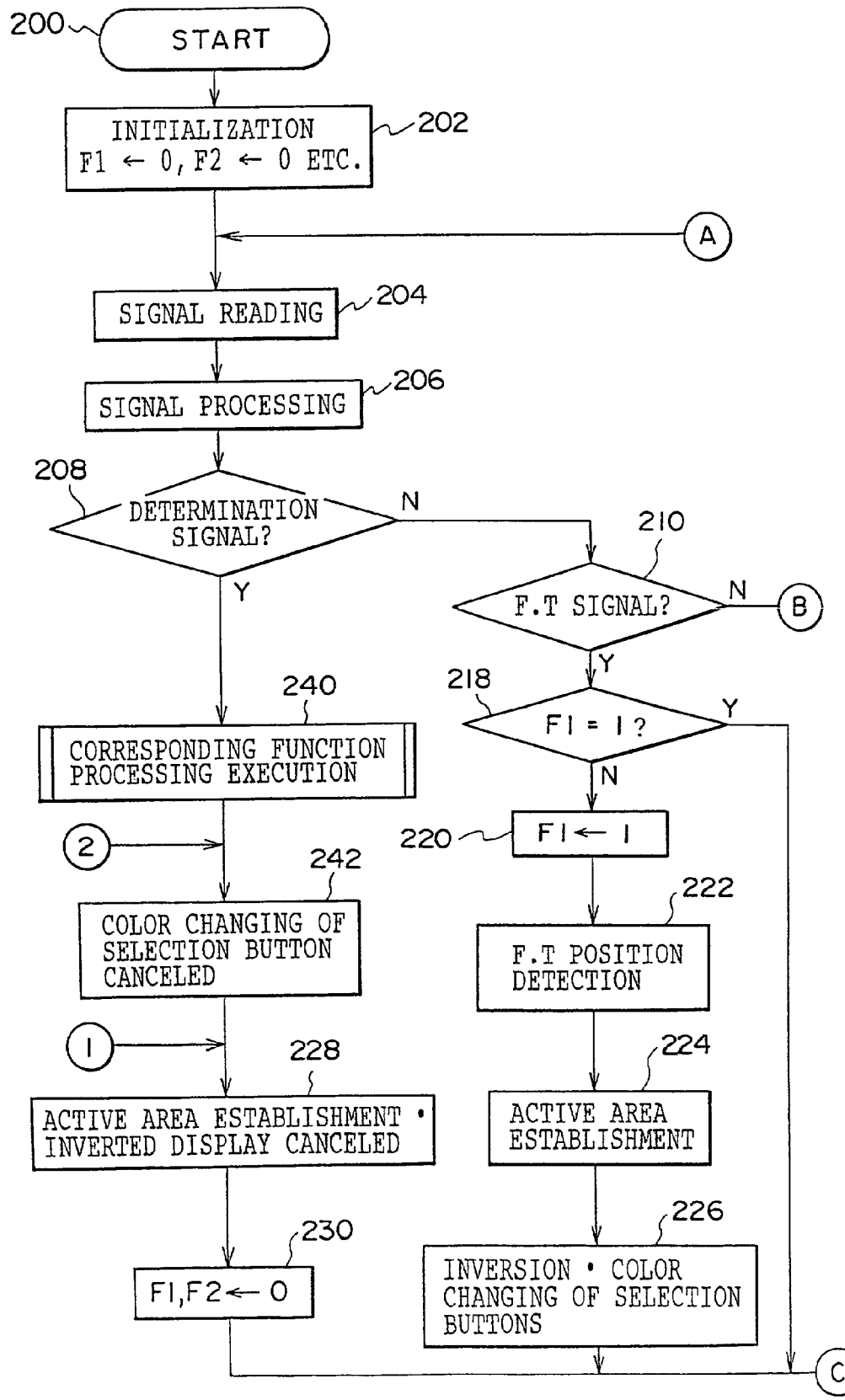
FIGS. 5A and 5B are flow charts schematically showing a function selecting and inputting program of the display operating system according to the first embodiment of the present invention.
Figure 5B:
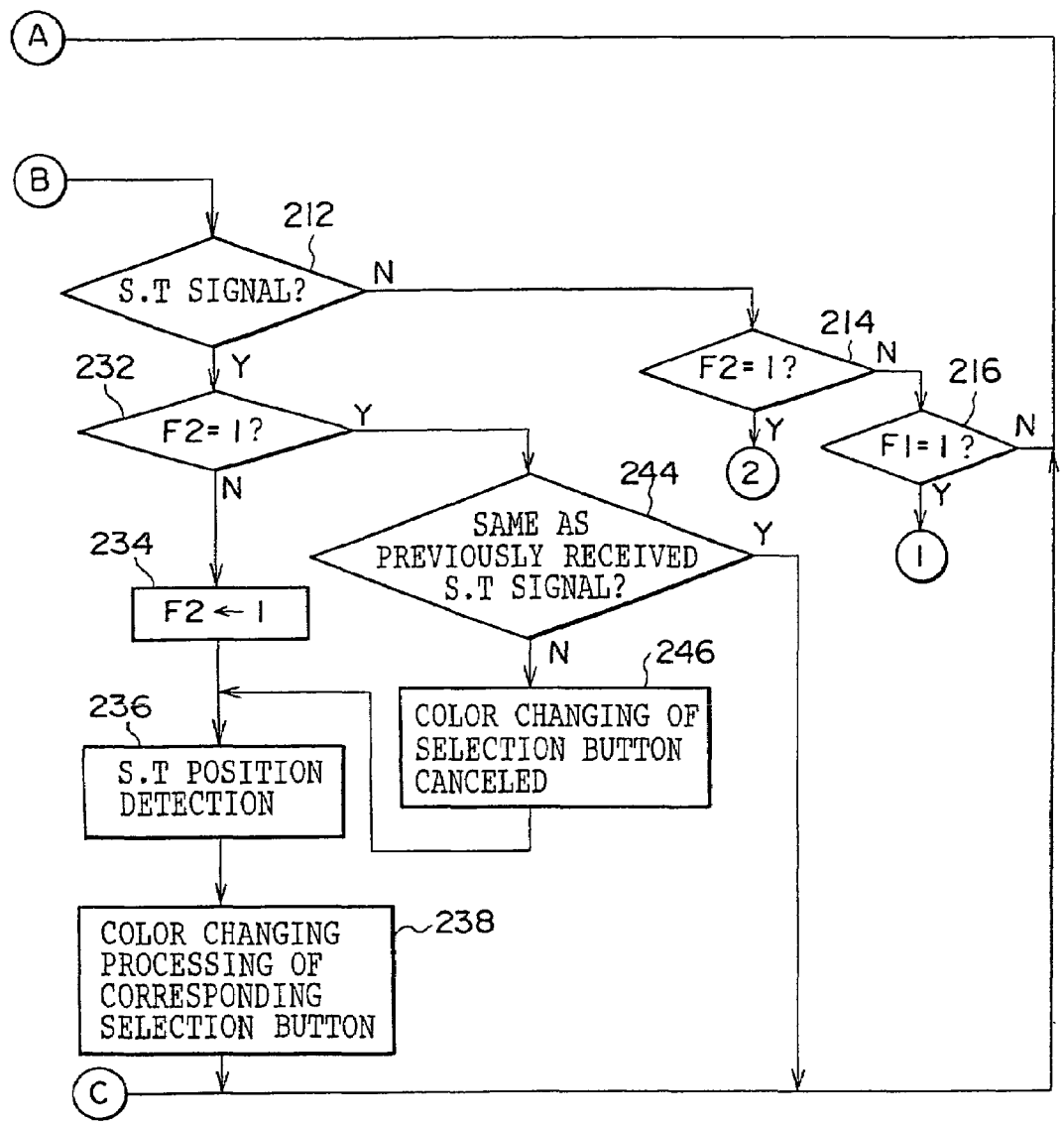

As shown in FIG. 5A, the function selecting and inputting program is read by the control unit 82 and started at step 200, and initialization processing is executed at step 202. In the initialization processing, each of flags F1 and F2 is reset with a value thereof substituted by "zero". Along with this, as shown in FIG. 6, the selection buttons 11 to 44 are displayed on the screen of the monitoring television 86.

Following this, at step 204, there is carried out reading of an electric signal corresponding to the infrared light signal L0 transmitted from the infrared light photodetector unit 80. This electric signal is processed at step 206. Then, at step 208, a decision is made as to whether the electric signal processed at step 206 is a determination signal or not.

Here, assuring none of the above-described light beams L1 and L2 is interrupted, that is, when no fingertip touches the panel 104, no pushing force is of course applied to the panel 104. Accordingly, a determination signal is not received. When the decision of step 206 is negative, the program proceeds from step 208 to step 210.

At step 210, a decision is made as to whether the signal processed at step 206 is a first-touch signal (hereinafter referred to as an "F.T signal") or not. The F.T signal is an interruption signal as a position detection signal, which is based on interruption of one of the light beams L1 and interruption of one of the light beams L2 both caused by a fingertip touching the panel 104 when there was no interruption of other light beams L1 and L2 immediately before the interruption. Namely, when an interruption signal is first received, an electric signal processed at the step 206 is determined as an F.T signal. In this case as well, if no fingertip is touching the panel 104, there is caused no interruption of the light beams L1 and L2. Therefore, the processing proceeds from step 210 to step 212.

At step 212, a decision is made as to whether the signal processed at step 206 is a second-touch signal (hereinafter referred to as an "S.T signal") or not. The S.T signal is an interruption signal as a determined candidate selection signal, which is based on interruption of one of the light beams L1 and interruption of one of the light beams L2 both caused by a fingertip touching the panel 104 when there was an interruption of other light beams L1 and L2 immediately before the interruption. Namely, when the interruption signal caused by interruption of the one of the light beams L1 and interruption of the one of the light beams L2, and the interruption signal caused by interruption of the other light beams L1 and L2 are received, the electric signal processed at the step 206 is determined as an S.T signal. In this case as well, when no fingertip is touching the panel 104, there is caused no interruption of the light beams L1 and L2. Therefore, the processing proceeds from step 212 to step 214.

At step 214, a decision is made as to whether the value of the flag F2 is "one" or not (that is, whether the flag F2 is flagged or not). In the present state, no light beams L1 and L2 were interrupted immediately before. Thus, neither the flag F1 nor the flag F1 has a value of "one". Therefore, in this state, the process proceeds from step 214 to step 216, and returns to step 204.

That is, when neither light beam L1 nor L2 is curently interrupted, and neither light beam L1 nor L2 was interrupted immediately before, the processing is in an initial standby state, circulating the loop as described above.

From the initial stand-by state, a fingertip touches the panel 104 to interrupt the light beam L1 emitted from the light-emitting diode 134 and the light beam L2 emitted from the light-emitting diode 142, for example, the light beam L1 and the light beam L2 are prevented from reaching the photodetectors 140 and 150, respectively. Thus, a signal L0 corresponding to the above state is emitted from the infrared light-emitting element 122. The signal L0 is received by the infrared light photodetector unit 80. An F.T signal corresponding to the signal L0 is read at the step 204, and the signal is processed at step 206. Then, this signal is decided to be an F.T signal at step 210 to proceed the processing to step 218.

At step 218, a decision is made as to whether the value of the flag F1 is "one" or not (that is, whether the flag F1 is flagged or not). In this case, because of the previous state being the initial stand-by state, the value of the flag F1 is not "one". Therefore, the value of the flag F1 is firstly substituted by "one" at step 220 to proceed the processing to step 222.

At step 222, a first-touch-position (hereinafter referred to as "F.T position") which is a present position of the fingertip on the panel 104 is detected from the F.T signal. Furthermore, at step 224, on the basis of the F.T position detected at step 222, an active area which is a selectable area (active selection buttons) is established. In the present case, on the upper right-hand side of the panel 104 in a plan view (a state shown in FIG. 3), light beams L1 and L2 are interrupted. That is, a fingertip is positioned on the upper right side of the panel 104. With this, of a plurality of the selection buttons 11 to 44 displayed in the form of a matrix with five rows and four columns on the screen of the monitoring television 86 shown in FIG. 6, the control unit 82 establishes an active area on the upper right-hand side of the matrix with the selection buttons 11 to 14, 21 to 24, and 31 to 34. The active area is established with four rows and three columns, which are equal to the number of the rows of the light beams L2 and the number of the columns of the light beams L1, respectively.

Figure 7:
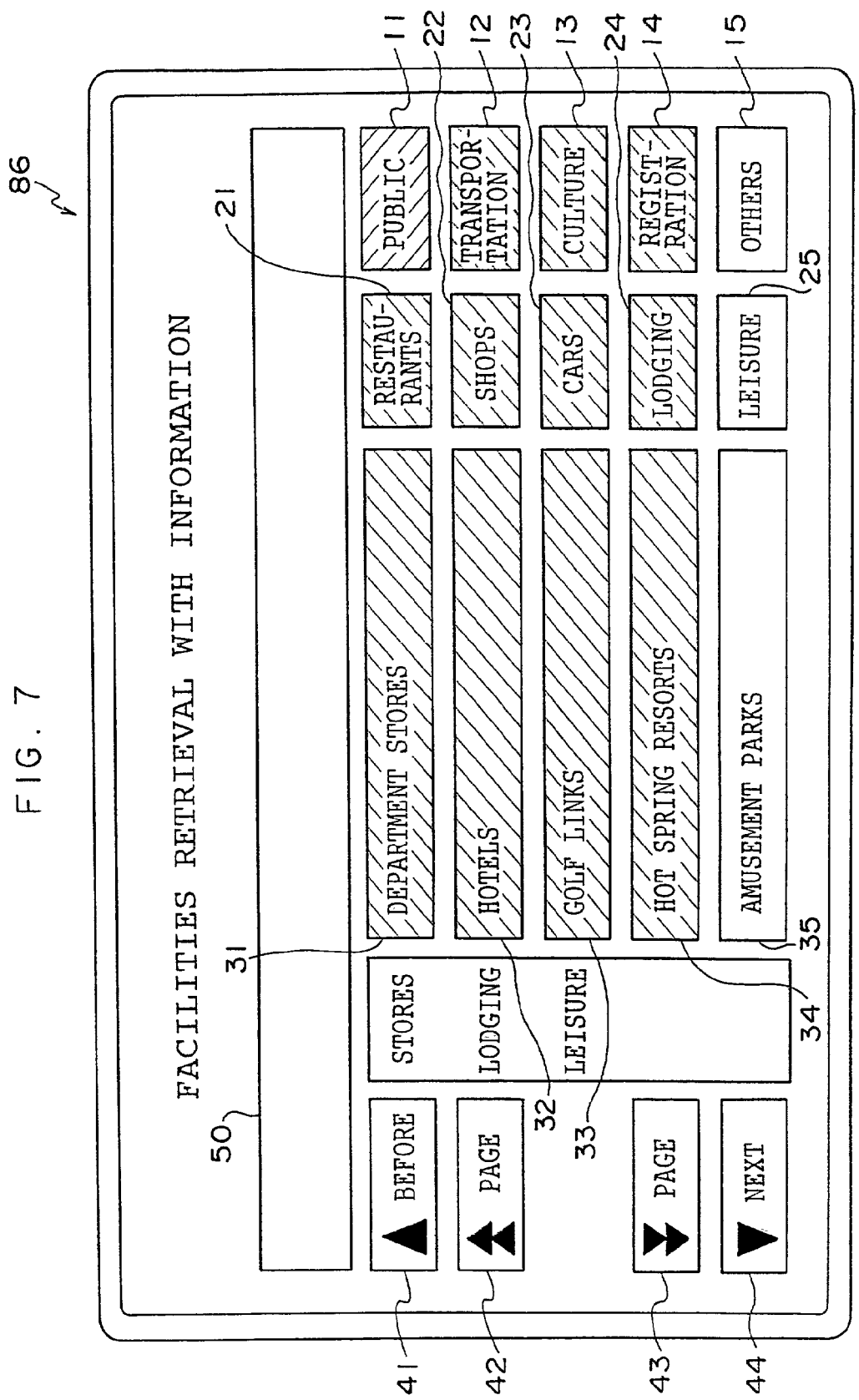
FIG. 7 is a front view showing the monitoring unit corresponding to FIG. 6 with a selection region being determined on the screen.

Following this, at step 226, as shown in FIG. 7, of the selection buttons 11 to 14, 21 to 24, and 31 to 34 in the active area, the selection buttons 12 to 14, 21 to 24, and 31 to 34 are displayed with color thereof (lightness and darkness of color thereof) inverted (hereinafter referred to as "inverted display"). Furthermore, in the step 226, of the selection buttons 11 to 14, 21 to 24, and 31 to 34 in the active area, a color of the selection button 11, which is at a position corresponding to the above-described F.T position, is changed. With this, it is shown that an area of the selection buttons 11 to 14, 21 to 24, and 31 to 34 is established as the active area, and with this, that the position of the fingertip on the panel 104 (i.e. F.T position) corresponds to the position of the selection button 11.

Figure 8:
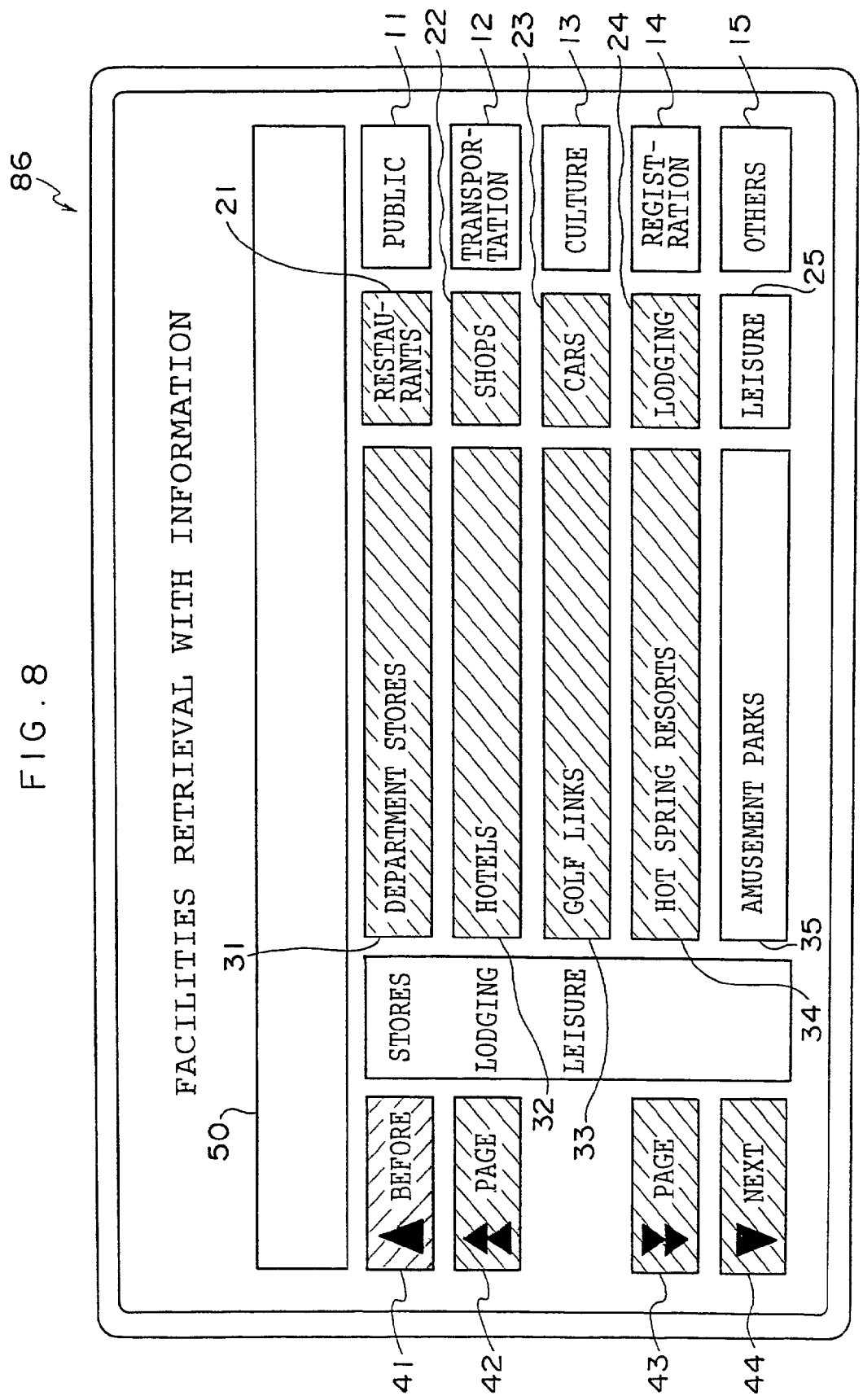
FIG. 8 is a front view showing the monitoring unit corresponding to FIG. 7 with the selection region being determined in another location on the screen.

Compared with this, when the light beams L1 and L2, respectively emitted from the light-emitting diodes 130 and 142, are interrupted by a fingertip, for example, the F.T position is brought onto the upper left side of the panel 104 in a plan view (a state shown in FIG. 3). Therefore, as shown in FIG. 8, the selection buttons 41 to 44, 31 to 34, and 21 to 24 are established as the active area forming, from the upper left selection button 41, four rows and three columns, which are equal to the number of the rows of the light beams L2 and the number of the columns of the light beams of L1, respectively. The selection buttons 42 to 44, 31 to 34, and 21 to 24 are displayed with inverted display and the color of the selection button 41 is changed.

Figure 9:
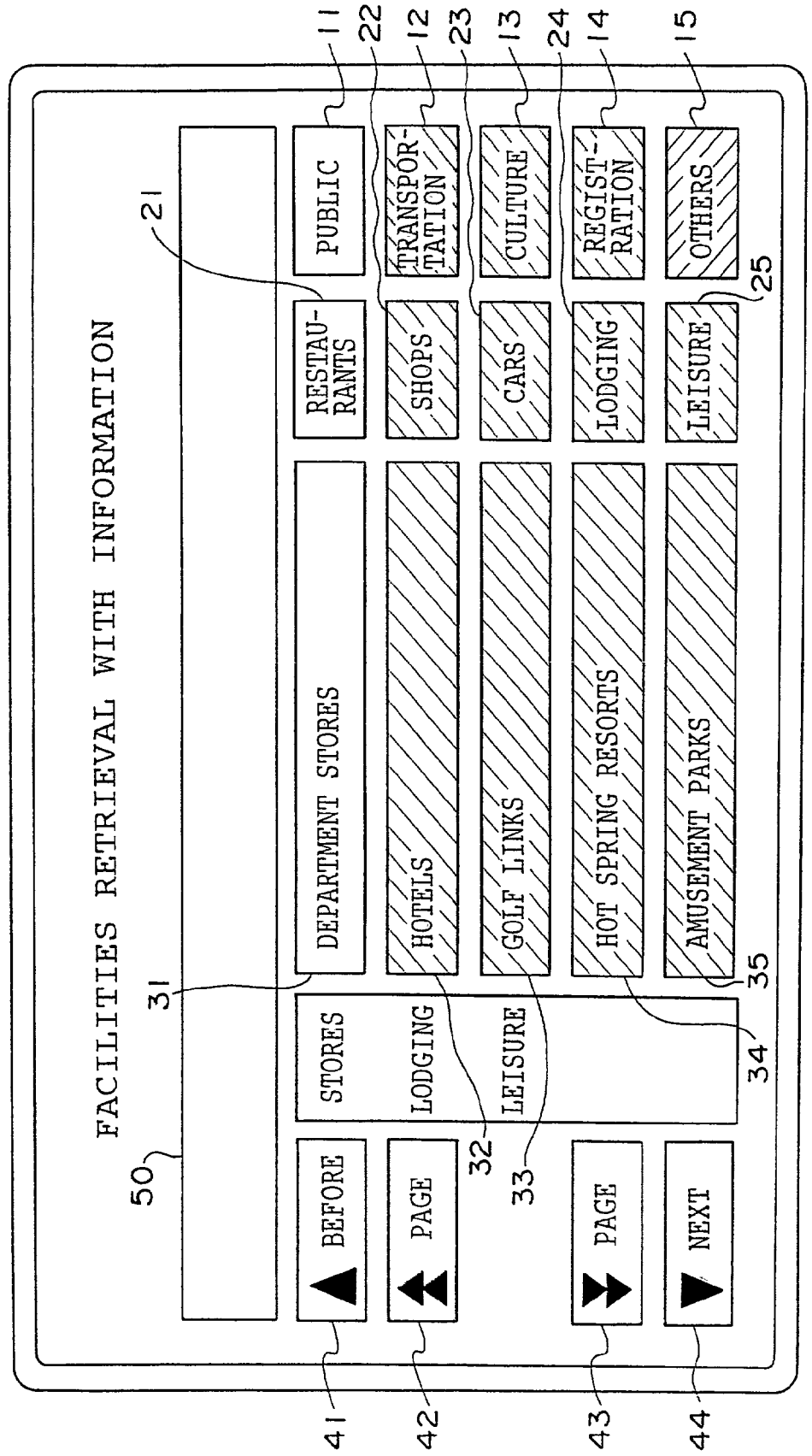
FIG. 9 is a front view showing the monitoring unit corresponding to FIG. 7 with the selection region being determined in further another location on the screen.

Moreover, when the light beams L1 and L2, respectively emitted from the light-emitting diodes 134 and 148, are interrupted by a fingertip, the F.T position is brought onto the lower right side of the panel 104 in a plan view (a state shown in FIG. 3). Therefore, as shown in FIG. 9, the selection buttons 12 to 15, 22 to 25, and 32 to 35 are established as the active area forming, from the lower right selection button 15, four rows and three columns, which are equal to the number of the rows of the light beams L2 and the number of the columns of the light beams of L1, respectively. The selection buttons 12 to 14, 22 to 25, and 32 to 35 are then displayed with inverted display and the color of the selection button 15 is changed.

Figure 10:
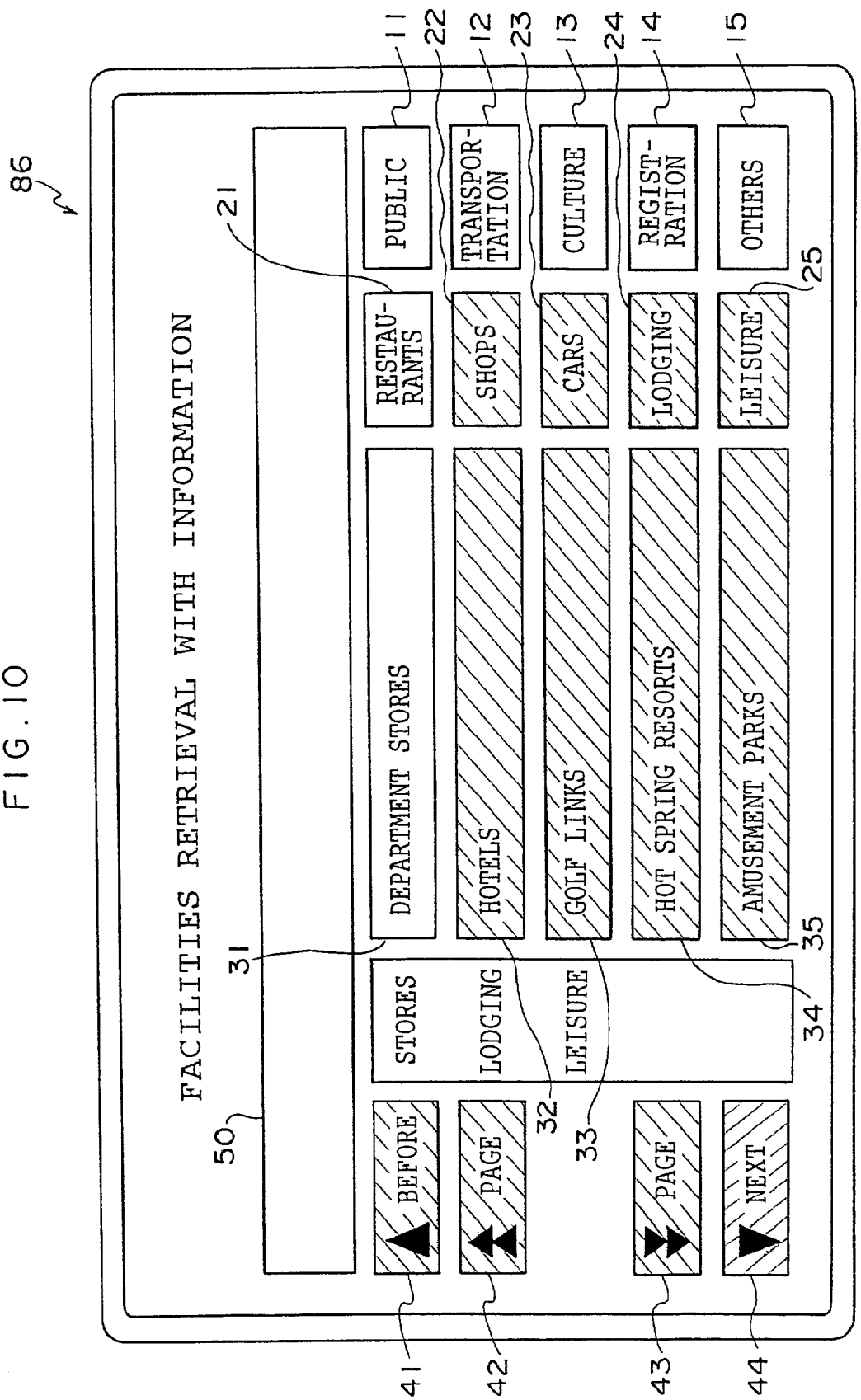
FIG. 10 is a front view showing the monitoring unit corresponding to FIG. 7 with the selection region being determined in further another different location on the screen.

Furthermore, when the light beams L1 and L2, respectively emitted from the light-emitting diodes 130 and 148, are interrupted by a fingertip, the F.T position is brought onto the lower left side of the panel 104 in a plan view (a state shown in FIG. 3). Here, only the column of the selection buttons 41 to 44, unlike the other columns of the selection buttons 11 to 15, 21 to 25, and 31 to 35 each constituted of five rows, is constituted of only four rows. Therefore, in each of the other columns of the selection buttons 11 to 15, 21 to 25, and 31 to 35, the fourth row from the bottom is the selection buttons 12, 22, and 32, which are in the second row from the top. However, in the column constituted of the selection buttons 41 to 44, the fourth row from the bottom includes the selection button 41, which is in the top row. Thus, in this case, as shown in FIG. 10, an active area is established from the lower left selection button 44 with the selection buttons 22 to 24, 32 to 34, and 41 to 44 forming four rows and three columns, which are equal to the number of the rows of the light beams L2 and the number of the columns of the light beams of L1, respectively. The selection buttons 22 to 24, 32 to 34, and 41 to 43 are displayed with inverted display and the color of the selection button 44 is changed.

After the selection buttons 11 to 14, 21 to 24, and 31 to 34 in the active area are displayed with inverted display or color change as shown in FIG. 7, the processing returns to step 204 again.

In this state, if the fingertip is separated from the panel 104 to make the light beams L1 and L2 free from interruption, the F.T signal is cancelled. Hence, in this case, the processing proceeds from step 210 to step 216 through steps 212 and 214. In this case, because the value of the flag F1 was substituted by "one" at step 220, the processing proceeds from step 216 to step 228.

At step 228, establishment of the active area carried out at step 224 is canceled. Along with this, inverted display of the selection buttons 11 to 14, 21 to 24, and 31 to 34, carried out at step 226, is also canceled. Following this, values of the flags are substituted by "zero" to reset flagging. Then, the processing returns to step 204 to be brought in the initial stand-by state again.

On the other hand, when the light beams L1 and L2, respectively emitted from the light-emitting diodes 134 and 142, are kept interrupted by the fingertip, i.e. in a state of continuing receiving the F.T signal, the processing proceeds from step 210 to step 218. However, because the flag F1 has been already substituted by "one", the processing directly returns to step 204 to be brought in a second-touch waiting state (circulating the loop).

Compared with this, in this state, when the fingertip moves approximately in parallel with the panel 104 to make the light beams L1 and L2, respectively emitted from the light-emitting diodes 134 and 142, free from interruption, and along with this, to interrupt other light beams L1 and L2, for example, emitted from the light-emitting diodes 132 and 144, respectively, an electric signal based on a signal L0 emitted from the infrared light-emitting element 122 at this time is processed at step 206. This electric signal based on the signal L0 emitted from the infrared light-emitting element 122 at this time is an electric signal which is based on interruption of one of the light beams L1 and one of the light beams L2 in a case in which an electric signal based on interruption of other light beams L1 and L2 has been received immediately before, namely, an F.T signal has been received immediately before. That is, the electric signal processed at step 206 at this time is an S.T signal. Therefore, the processing is to proceed from step 206 to step 212 through steps 208 and 210 before being subjected to a decision at step 212 for proceeding to step 232.

At step 232, a decision is made as to whether the value of the flag F2 is "one" or not (i.e. the flag F2 is flagged or not). As described above, immediately after the light beams L1 and L2, respectively emitted from the light-emitting diodes 134 and 142, are made free from interruption, and other light beams L1 and L2, respectively emitted from the light-emitting diodes 132 and 144, are interrupted, the signal received immediately before was the F.T signal. Therefore, in this state, the value of the flag F2 is "zero", which makes the processing proceed to step 234 where the value of the flag F2 is substituted by "one". Then, the processing further proceeds to step 236.

At step 236, a second-touch position (hereinafter referred to as "S.T position") is detected from the S.T signal as a present position of a fingertip on the panel 104. In this case, of the light beams L1 being in three columns in total, the light beam L1 emitted from the light-emitting diode 132 is in the second column from the left and, of the light beams L2 being in four rows in total, the light beam L2 emitted from the light-emitting diode 144 is in the second row from the top. Therefore, this position is designated as the S.T position.

Figure 11:
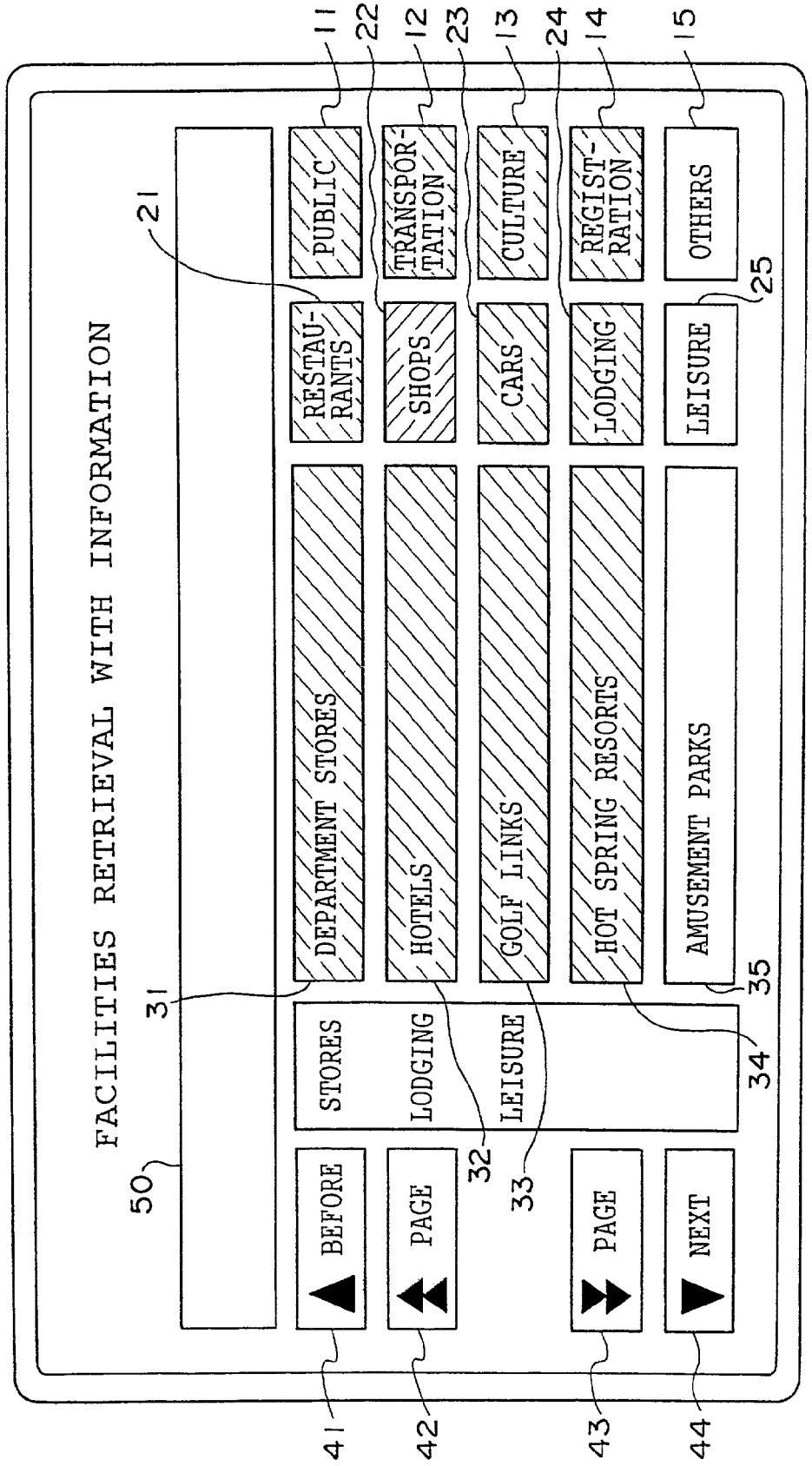
FIG. 11 is a front view showing the monitoring unit corresponding to FIG. 6 with a selection element being made as a determined candidate and a color thereof being changed on the screen.

Following this, at step 238, of the selection buttons 11 to 14, 21 to 24, and 31 to 34 in the above described active area, the selection button 22 at a position corresponding to the above described S.T position, namely, in the second row from the top and in the second column from the left of the selection buttons 11 to 14, 21 to 24, and 31 to 34 in the active area arranged in a matrix, is processed so as to change the color thereof as shown in FIG. 11. Along with this, the color of the selection button 11 is changed to the same one as the color of the selection buttons 12 to 14, 21, 23, 24, and 31 to 34 (namely, inverted display with respect to the normal state). Then, the processing returns to step 204.

In this state, when the fingertip is separated from the panel 104 to make the light beams L1 and L2 free from interruption, the S.T signal is to be cancelled. Hence, the processing proceeds from step 212 to step 214. In this case, because the value of the flag F2 was substituted by "one" in step 234, the processing proceeds from step 214 to step 242.

At step 242, color changing of the selection button 22 is canceled. Then, the processing proceeds to step 228 at which establishment of the active area is canceled with cancellation of inverted display of the selection buttons 11 to 14, 21 to 24, and 31 to 34. Furthermore, each of the values of the flags F1 and F2 is "zero", and the processing returns to step 204 to be brought in the initial stand-by state again.

Compared with this, if the panel 104 is pushed by a fingertip to shift toward the lower case 92 against the force exerted by the compressed coil springs 106 in a state of color changing processing of the selection button 22 being carried out, there is provided continuity between the movable contact of the movable part and the fixed contact of the main part 112 of the push switch 110. The continuity is detected by the CPU 118, which makes the infrared light-emitting element 122 emit an infrared light signal L0 based on the continuity signal.

The infrared light signal L0 corresponding to the continuity signal is received by the infrared light photodetector unit 80 and then an electric signal corresponding to L0 is received by the control unit 82 at step 204. The electric signal is further processed at step 206 and the processed signal is decided at step 208 as a continuity signal, that is, a determination signal. Then, at step 240, processing of a function which corresponds to characters and signs given on the selection button 22 is started. The processing further proceeds to step 242.

At step 242, color changing of the selection button 22 is canceled. Then, the processing proceeds to step 228 at which establishment of the active area is canceled with cancellation of inverted display of the selection buttons 11 to 14, 21 to 24, and 31 to 34. Furthermore, with each of the values of the flags F1 and F2 substituted by "zero", the processing returns to step 204 to be brought in the initial stand-by state again.

In the meantime, after the color changing processing of the selection button 22 has been carried out at step 238, when the finger continues interrupting the light beams L1 and L2 respectively emitted from the light-emitting diodes 132 and 144 without pushing the panel 104, a state is provided in which the S.T signal is continuously received. This makes the processing proceed from step 212 to 232. Here, the value of the flag F2 has been substituted by "one" already at step 234 in the previous processing. Thus, the processing proceeds from step 232 to step 244.

At step 244, a decision is made as to whether or not the S.T signal at this time is the same as the S.T signal received at the previous time, namely, whether or not the S.T signal is the S.T signal based on interruption of the light beams L1 and L2 emitted from the light-emitting diodes 132 and 144, respectively. While the finger continues to interrupt the light beams L1 and L2 respectively emitted from the light-emitting diodes 132 and 144, the S.T signal at this time is of course the same as the previous one. Hence, the processing directly returns to step 204. That is, in a state in which a finger continues to interrupt the light beams L1 and L2 respectively emitted from the light-emitting diodes 132 and 144 without pushing the panel 104 after the color changing processing of the selection button 22 has been carried out at the step 238, the processing is brought in a pushing waiting state to wait for the above described determination signal to be given by pushing the panel 104. In the pushing waiting state, the processing circulates a loop starting from step 204, proceeding to step 244 through steps 212 and 232, and then directly returning to step 204.

Moreover, after the color changing processing of the selection button 22 has been carried out at step 238, when the fingertip is made to slide in parallel with the panel 104 again to cancel interruption of the light beams L1 and L2 respectively emitted from the light-emitting diodes 132 and 144, and the light beams L1 and L2 respectively emitted from the light-emitting diodes 130 and 148 are interrupted by the fingertip, the processing proceeds to step 244. The S.T signal at this time is based on interruption of the light beams L1 and L2 respectively emitted from the light-emitting diodes 130 and 148, and is not based on the preceding interruption of the light beams L1 and L2 respectively emitted from the light-emitting diodes 132 and 144 (that is, not the same S.T signal as that received last time) Therefore, the processing proceeds from step 244 to step 246, at which color changing of the selection button 22 is canceled. Then the processing proceeds to step 236.

At step 236, the S.T position which is the present position of the fingertip on the panel 104 is detected from the received S.T signal. In this case, the light beam L1 emitted from the light-emitting diode 130 is in the first column from the left and the light beam L2 emitted from the light-emitting diode 148 is in the fourth row from the top. Therefore, that position is designated as the S.T position.

Figure 12:
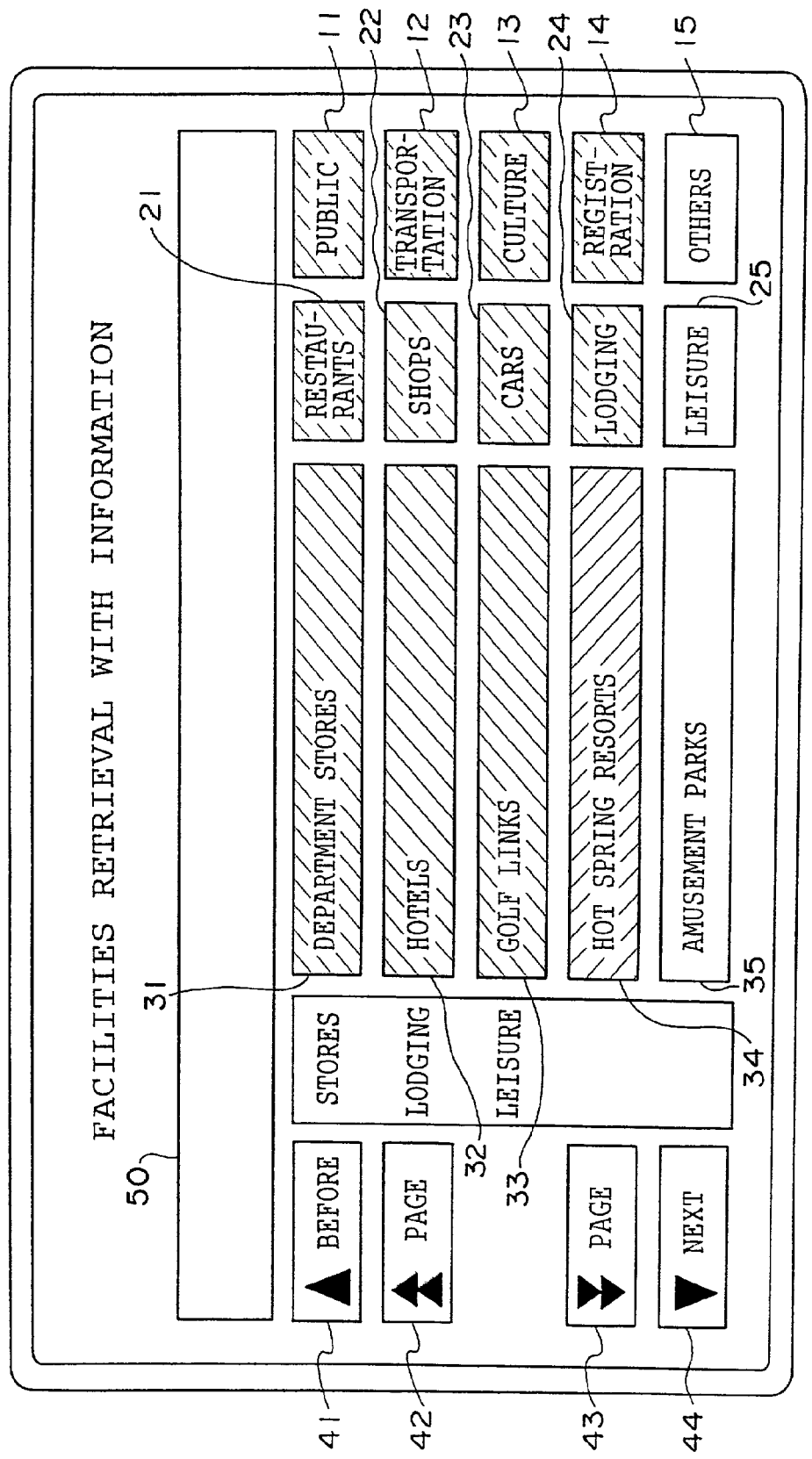
FIG. 12 is a front view showing the monitoring unit corresponding to FIG. 11 with a determined candidate being changed to another selection element on the screen.

Following this, at step 238, of the selection buttons 11 to 14, 21 to 24, and 31 to 34 in the active area, the selection button 34 in the first column from the left and in the fourth row from the top is subjected to color changing as shown in FIG. 12. Thereafter, the processing is brought in the pushing signal waiting state.

As described above, in this embodiment, an active area in correspondence with an F.T position is established on the basis of an F.T signal. In the active area, of selection buttons 11 to 44, buttons are made selectable. These buttons are arranged with the number of rows and the number of columns being equal to the number of rows of the light beams L2 and the number of columns of the light beams L1, respectively. This makes it possible to easily select a selection button that can carry out a desired function from the selection buttons 11 to 44 even though the number of the rows of the light beams L2 and the number of the light beams L1 are less than the number of the rows and the number of columns of the selection buttons 11 to 44.

Thus, the selection buttons 11 to 44 can be provided irrespective of the number of the rows of the light beams L2 and the number of the columns of the light beams L1 of the controller 90. This increases flexibility in designing a program (software) of the car navigation system 70 such as a design of screen image of the monitoring television 86.

Conversely, the number of the rows of the light beams L2 and the number of the columns of the light beams L1 can be determined irrespective of the number of the rows and the number of the columns of the selection buttons 11 to 44, therefore, flexibility in designing the controller 90 increase.

Furthermore, there is no necessity for making the number of the rows of the light beams L2 and the number of the columns of the light beams L1 match the number of the rows and the number of the columns of the selection buttons 11 to 44. This allows no change in the controller 90 even if there is a change in the number of the rows and the number of the columns of the selection buttons 11 to 44 due to change in a program (software) of the car navigation system 70. Therefore, change in a specification of a program (software) of the car navigation system 70 (so-called version upgrading) can be made easily.

In addition, even if the car navigation system 70 employs programs (pieces of software) in which numbers of rows and numbers of columns of selection buttons 11 to 44 differ, the controller 90 can be made common to such systems to contribute to cost reduction.

In the embodiment, in changing the active area, the fingertip is once separated from the panel 104 and then touches the panel 104 again. Consequently, after an active area is established as above, a desired selection button can be selected by a fingertip sliding to a position corresponding to the desired selection button among the selection buttons 11 to 44. This facilitates operation and allows immediate selection of the desired selection button from among selection buttons 11 to 44.

In this embodiment, a change in the S.T position changes color of one of the selection buttons 11 to 44 at a position corresponding to the changed S.T position. This basically allows an operation to be carried out without watching the controller 90 while the screen of the monitoring television 86 is watched.

Moreover, in the embodiment, of the selection buttons 11 to 44, a selection button at a position corresponding to each of four corners of an active area can be selected by abutting a fingertip against one of four corners of the opening 100 of the controller 90. This allows an operation without watching the controller 90 and the screen of the monitoring television 86.

Second Embodiment

Next, a second embodiment according to the present invention will be explained. In the second embodiment, mechanical constitution is identical with that in the first embodiment.(Function selecting and inputting program is different.) Therefore, explanation about mechanical constitution of the embodiment will be omitted. In explaining the function selecting and inputting program of the second embodiment, a step carrying out processing identical with processing carried out in a corresponding step in a function selecting and inputting program of the first embodiment will be designated by an identical sign (step number) with explanation thereof omitted.

The feature of the second embodiment according to the present invention is that a scrolling function, which can change an active area without separating a fingertip from the panel 104 after the selection buttons corresponding to the active area are displayed with inverted display, is added.

Figure 13A:
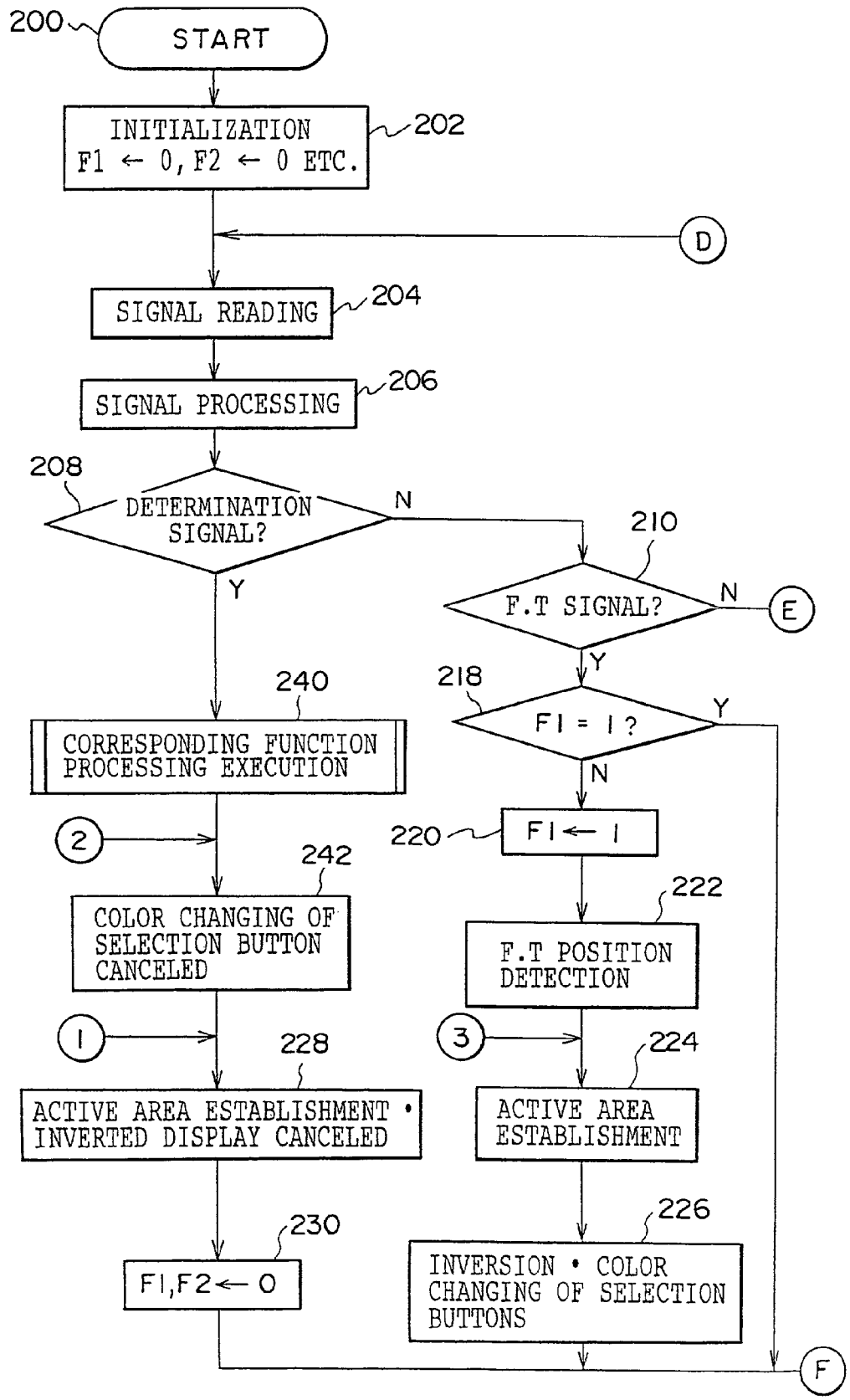
FIGS. 13A and 13B are flow charts schematically showing a function selecting and inputting program of the display operating system according to the second embodiment of the present invention.
Figure 13B:
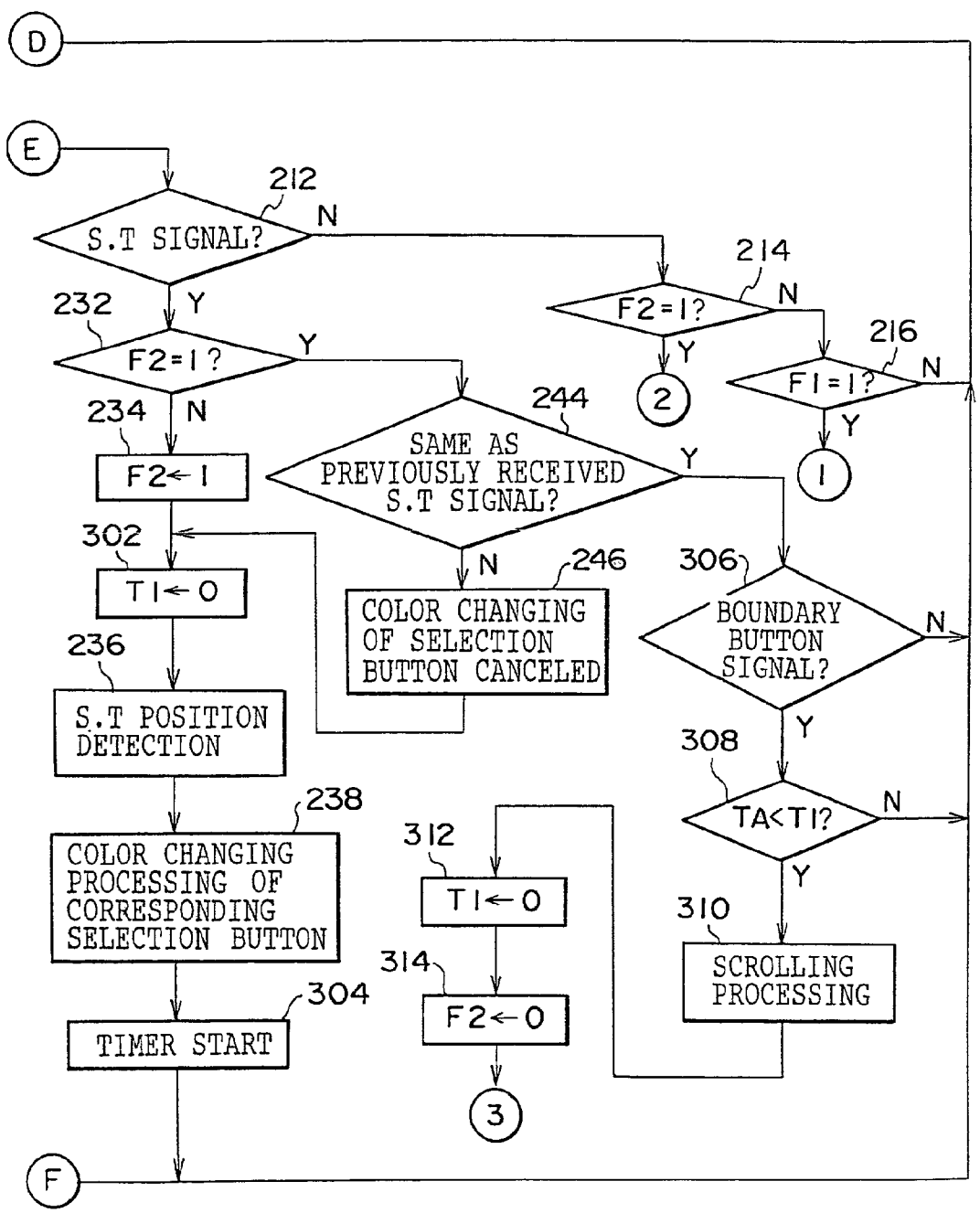

In the following, the above scrolling function will be explained by using a flowchart shown in FIGS. 13s 13A and 13B.

In the second embodiment, like in the first embodiment, when, for example, a fingertip is slid substantially parallel with the panel 104 to cancel interruption of the light beams L1 and L2 respectively emitted from the light-emitting diodes 134 and 142, and along with this, to interrupt the light beams L1 and L2 respectively emitted from the light-emitting diodes 132 and 144, with an area of the selection buttons 11 to 14, 21 to 24, and 31 to 34 being established as an active area as shown in FIG. 7, at step 212 a signal processed at step 206 is decided as being an S.T signal.

At this time, at immediately after cancellation of interruption of the light beams L1 and L2 respectively emitted from the light-emitting diodes 134 and 142, and interruption of the light beams L1 and L2 respectively emitted from the light-emitting diodes 132 and 144, the processing proceeds from step 232 to step 234, at which the value of the flag F1 is substituted by "one". Here, unlike the first embodiment in which the processing proceeds to step 236 after step 234, in the second embodiment, processing at step 302 is provided between step 234 and step 236. At step 302, an elapsed time value T1 is reset in a timer program (that is, T1 is substituted by "zero"). After the processing at step 302, processing is carried out at step 236 and step 238. In the second embodiment, After the processing at step 238, the above-described timer program is started at step 304.

In this state, when the fingertip is slid again with respect to the panel 104 to cancel interruption of at least one of the light beam L1 emitted from the light-emitting diode 132 and the light beam L2 emitted from the light-emitting diode 144, and to interrupt light beams other than this light beam L1 and light beam L2, the processing proceeds from step 244 to step 302 again through step 246 to reset the elapsed time value T1 of the timer program.

On the other hand, when there is continued interruption of the light beams L1 and L2 respectively emitted from the light-emitting diodes 132 and 144, unlike the above first embodiment in which the processing returns to 204, the processing proceeds to step 306. At step 306, a decision is made from the S.T signal as to whether or not the selection button subjected to color changing processing is adjacent to selection buttons positioned in an area other than the active area, that is, whether or not the button subjected to color changing processing is one positioned at a boundary position with respect to the selection buttons in the area other than the active area (in the flowchart, named as a boundary button).

Here, in the case as shown in FIG. 11, the selection buttons 14, 24, and 31 to 34 are respectively adjacent to the selection buttons 15, 25, and 41 to 44 in an area other than the active area. However, the selection button 22 is not adjacent to the selection buttons 15, 25, 35 and 41 to 44 in the area other than the active area. Thus, the processing returns to step 204 from step 306.

Figure 14:
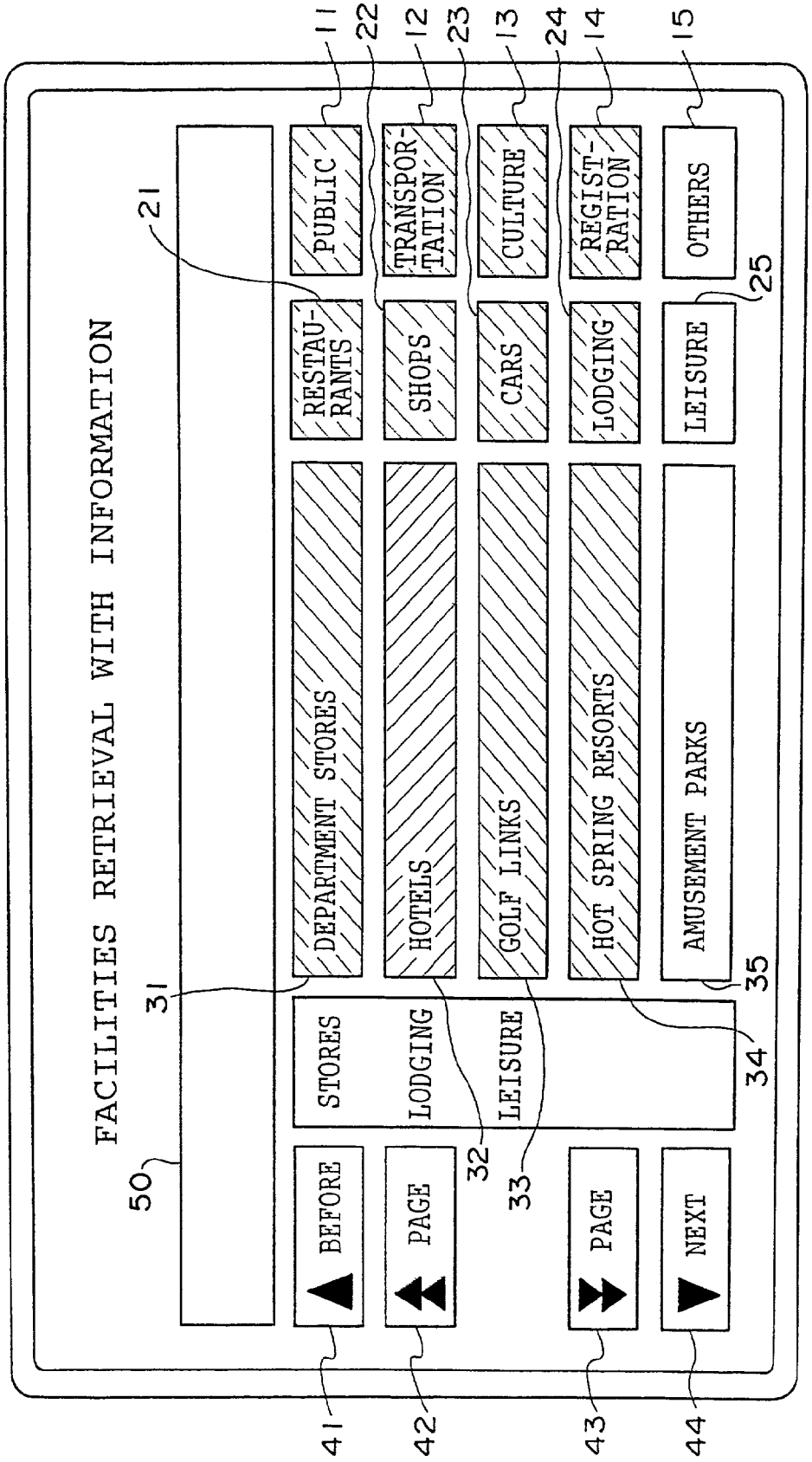
FIG. 14 is a front view showing the monitoring unit corresponding to FIG. 11 with a selection element at a boundary position being made a determined candidate and a color thereof being changed on the screen.

On the other hand, as shown in FIG. 14, for example, when the area of the selection buttons 11 to 14, 21 to 24, and 31 to 34 are made as an active area and the selection button 32, as a determined candidate, is subjected to color changing processing, and thereafter, a state of interrupting the light beams L1 and L2 respectively from the light-emitting diodes 130 and 144 is still continued (in other words, when there is continued a state of interrupting the light beams L1 and L2 respectively from the light-emitting diodes 130 and 144 at a position corresponding to the selection button 32 adjacent to the selection buttons 41 to 43 in an area other than the active area), the processing proceeds to step 306 to step 308. There, an elapsed time value T1 is compared with a time value TA set beforehand. The elapsed time value T1 is a value of time elapsed from the start of the timer program after interruption of the light beams L1 and L2 respectively from the light-emitting diodes 130 and 144. While the elapsed time value T1 does not exceed the set time value TA, the processing returns to step 204. Contrary to this, when the elapsed time value T1 exceeds the set time value TA, the processing proceeds to step 310.

At the step 310, like at step 246, color changing processing of the selection button 32, which was made as a determined candidate with the color thereof processed to be changed, is cancelled. Along with this, like at step 228, the establishment of the active area and inverted display of the selection buttons 11 to 14, 21 to 24, and 31 to 34 are also canceled. Moreover, from the location of this cancelled active area (buttons 11 to 14, 21 to 24, and 31 to 34) and the position of the selection button 32 which was subjected to color changing processing up to that time, there is determined a direction of scrolling the active area. In the second embodiment, the contents of processing at step 310 is determined so that a direction approximately equal to a direction from a central portion of the cancelled active area to the selection button which was subject to color changing processing becomes the direction of scrolling.

Therefore, as shown in FIG. 14, when an area of the selection buttons 11 to 14, 21 to 24, and 31 to 34 is established as an active area and the selection button 32 is subjected to color changing processing, the direction of scrolling is taken in principle upward and toward the left in FIG. 14. In this case, however, of the selection buttons 11 to 44 displayed in a form of a matrix, the selection buttons 11, 21, and 31 in the first row were already in the active area. Therefore, the active area can be no further scrolled upward in the screen of the monitoring television 86. Thus, in this case, the active area is to be scrolled leftward in the screen of the monitoring television 86.

After the direction of scrolling is thus determined at step 310, the elapsed time value T1 in the timer program is reset at step 312. Along with this, the flag F2 is reset at step 314. Further, from this state, the processing proceeds to step 224 at which a new active area is established. Along with this, at step 226, as shown in FIG. 8, an area of the selection buttons 21 to 14, 31 to 34, and 41 to 44 positioned leftward as a whole from the previous active area is established as a new active area, with the selection buttons 21 to 24, 31 to 34, and 42 to 44 displayed with inverted display. Along with this, the selection button 41 is displayed with the color thereof changed.

From this state, when the light beams L1 and L2 corresponding to one of the selection buttons 21 to 24, 31 to 34, and 41 to 44 are interrupted, a signal at this time becomes a new S.T signal. The one of selection buttons 21 to 24, 31 to 34, and 41 to 44 corresponding to this interrupted L1 and L2 is taken as a determined candidate to be processed for color changing. Then, the color of the selection button 41 which was a determined candidate up to that time is changed to a color the same as a color of the selection buttons other than the selection button which newly becomes a determined candidate in the active area. (Namely, button 41 is displayed with inverted display.)

As described above, in the second embodiment, of the selection buttons 11 to 44, when a selection button positioned in an area other than an active area is to be selected, the active area is made to scroll by sliding a fingertip approximately in parallel with the panel 104 in a direction corresponding to a direction in which the desired one of the selection buttons 11 to 44 is positioned. With this, the desired one of the selection buttons 11 to 44 can be made included in the active area. Therefore, even when no desired one of the selection buttons 11 to 44 is included in an active area, it is unnecessary to separate the fingertip from the panel 104, thus providing excellent operability.

In the previous first embodiment, if selection buttons are displayed with the number of rows exceeding the square of the number of the light beams L2 (in the first embodiment, the square of four, i.e. 16 rows) or the number of columns exceeding the square of the number of the light beams L1 (in the first embodiment, the square of three, i.e. 9 columns), a region is formed in which the active area can not be established. Therefore, in the above first embodiment, the numbers of rows and columns that can be displayed on the monitoring television 86 are limited by the numbers of the light beams L1 and L2.

Compared with this, in the second embodiment, the function of scrolling an active area provides no region in which the active area can not be established. This eliminates limitation to the numbers of rows and columns of the selection buttons displayed on the screen of the monitoring television 86 to increase design flexibility.

In the second embodiment, a constitution was explained in which the active area is simply scrolled. The constitution, however, maybe provided so that, for example, a scrolling speed of an active area (that is, a changing speed of the active area) is changed in accordance with a time length measured from cancellation of interruption of the light beams L1 and L2 to the next interruption of other light beams L1 and L2.

Moreover, in the second embodiment, on the basis of a direction approximately equal to a direction from a central portion of the active area to the selection button which is subject to color changing processing, scrolling direction to a new active area (active area changing direction) is determined. (Namely, a fingertip is slid in a direction corresponding to a direction in which the desired one of the selection buttons 11 to 44 is positioned) The constitution may be provided so that a scrolling direction is determined on the basis of a path of an S.T position when the S.T position is changed.

Furthermore, in the second embodiment, it is possible to change (to scroll) an active area basically in all directions. Instead of this, a constitution may be provided in which a location of an active area can be changed, for example, only in a specified direction such as a direction of the row or the column of the selection buttons 11 to 44 (in other words, a constitution of inhibiting or limiting scrolling to a particular direction).

Third Embodiment

Now, a third embodiment according to the present invention will be explained. In the third embodiment, mechanical constitution is identical with that in the first and second embodiments. (Function selecting and inputting program is different.) Therefore, explanation about mechanical constitution of the embodiment will be omitted. In explaining the function selecting and inputting program of the third embodiment, a step carrying out identical processing with a processing carried out in a corresponding step in a function selecting and inputting program of the first or the second embodiments will be designated by an identical sign (step number) with explanation thereof omitted.

The third embodiment according to the present invention is characterized in that there are additionally provided a holding function for holding an inverted state in which the selection buttons in an active area are displayed with an inverted display and a holding function for holding a color changed state of one of the selection buttons subjected to color changing processing in the active area.

In the following, the holding functions will be explained by using a flow chart in FIGS. 15A and 15B.

First, in the third embodiment, unlike the first and second embodiments, there is no processing carried out at step 214 and step 216. Therefore, when a signal processed at step 206 is decided as not being a S.T signal at step 212, the processing directly returns to step 204.

Moreover, in the third embodiment, when a signal processed at step 206 is decided as being an F.T signal at step 210, subsequent processing is carried out in a way different from those carried out in the first and second embodiments.

Figure 15A:
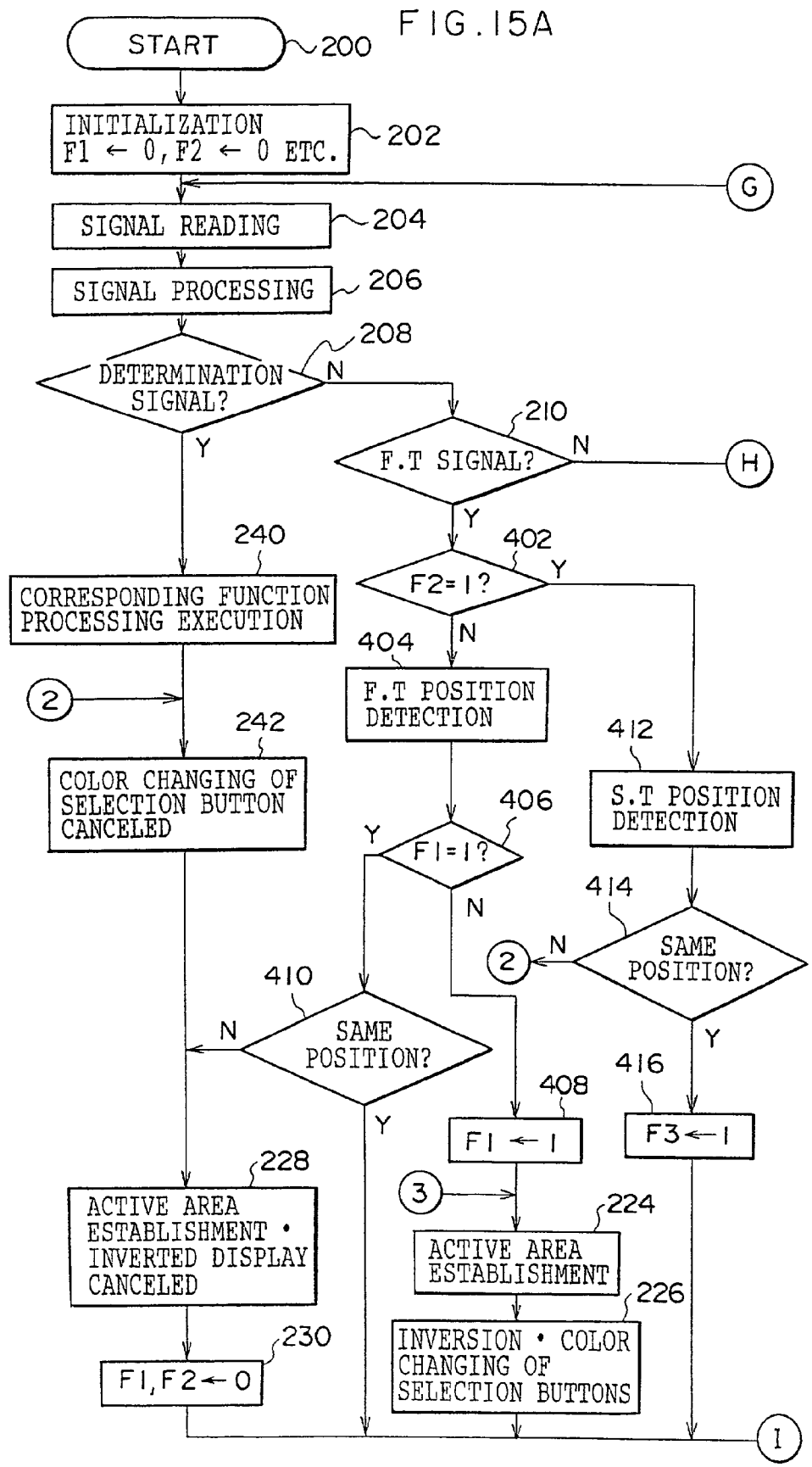
FIGS. 15A and 15B are flow charts schematically showing a function selecting and inputting program of the display operating system according to the third embodiment of the present invention.
Figure 15B:
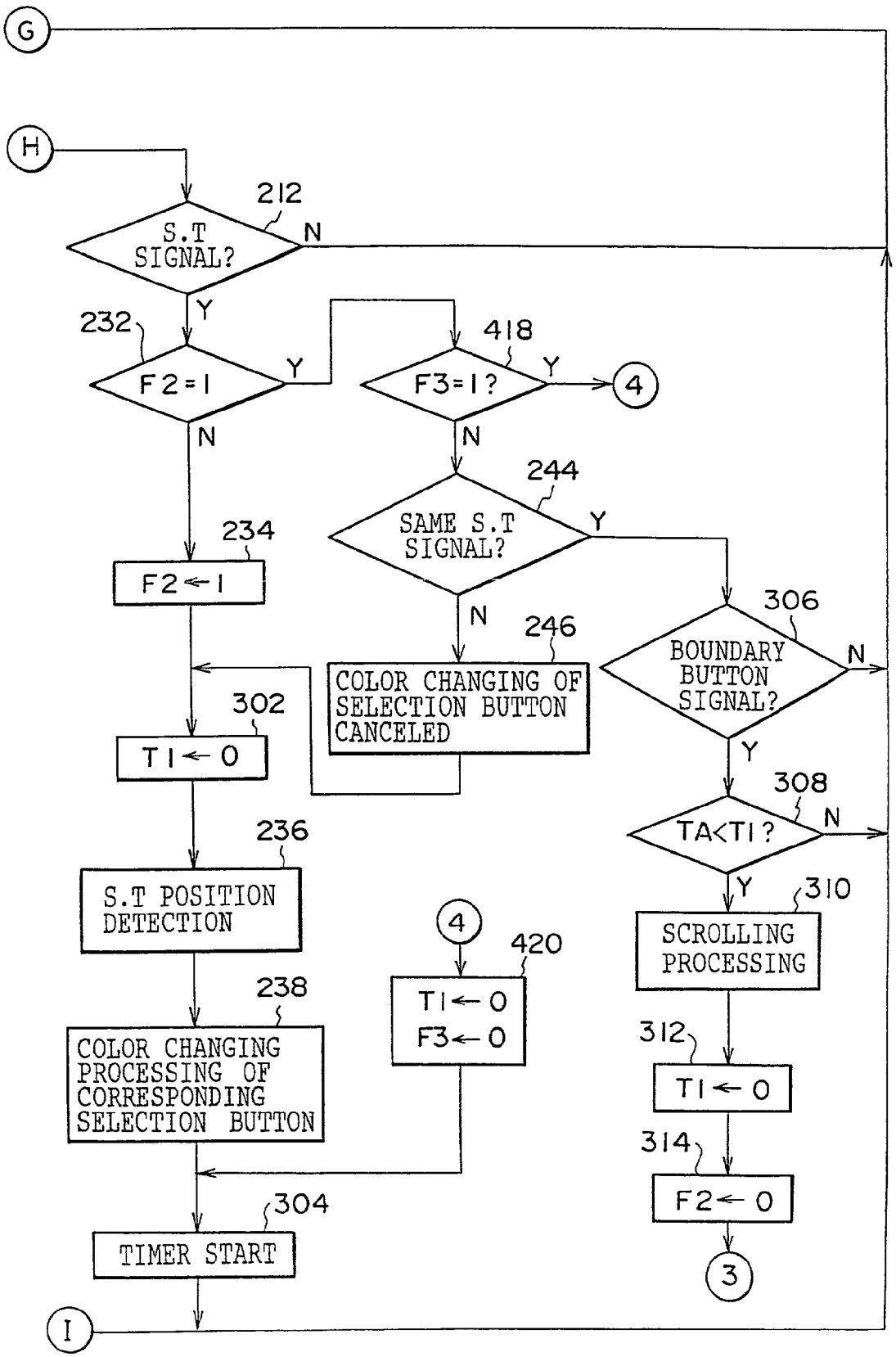

That is, when the light beams respectively emitted from the light-emitting diodes 134 and 142 are interrupted by a fingertip touching the panel 104 in the initial stand-by state and a signal based on the interruption is decided as being an F.T signal at step 210, the processing proceeds to step 402 as shown in FIG. 15A. At step 402, a decision is made as to whether the value of the flag F2 is "one" or not. Like in the above first embodiment, the flag F2 is in the reset state during the initial stand-by state. Therefore, the processing proceeds to step 404 at which an F.T position is detected. The processing further proceeds to step 406 at which a decision is made as to whether the value of the flag F1 is "one" or not. During the initial stand-by state, the flag F1 is in the reset state. Therefore, the processing proceeds to step 408, at which the value of the flag F1 is substituted by "one", and the processing proceeds to step 224 and 226 to a second-touch waiting state.

In this state, when the fingertip is separated from the panel 104, because a signal processed at step 206 is neither the F.T signal nor the S.T signal, the processing returns to step 204 through steps 210 and 212. However, neither step 214 nor step 216 is provided in the function selecting and inputting program in the third embodiment. Thus, the active area established at step 224 is not cancelled. Moreover, no processing is carried out for canceling inverted display of the selection buttons 12 to 14, 21 to 24, and 31 to 34 in the active area or color changing of the selection button 11, both having been processed at step 226. Therefore, in the third embodiment, even when a fingertip is separated from the panel 104, on the screen of the monitoring television 86, the selection buttons 12 to 14, 21 to 24, and 31 to 34 are displayed with inverted display thereof being retained and the selection button 11 is displayed with color changing thereof being retained (the state shown in FIG. 7). That is, there are retained establishment of the active area, inverted display, and color changing display of a selection button.

In this state, when the fingertip touches the panel 104 again to interrupt the light beams L1 and L2, because the finger was separated from the panel 104 once, and no electric signal was received based on interruption of other light beams L1 and L2 immediately before, the electric signal at this time, which is due to interruption of the light beams L1 and L2 by the fingertip again touching the panel 104, is decided as being an F.T signal at step 210. Thus, the processing proceeds to step 402.

Following this, at step 402, a decision is made as to whether the value of the flag F2 is "one" or not. At this time, the value of the flag F2 is not yet "one". Thus, the processing proceeds to step 404 at which an F.T position is detected. Further at step 406, a decision is made as to whether the value of the flag F1 is "one" or not. Here, as described above, the value of the flag F1 has been already substituted by "one" at step 408, and the flag F1 is not reset. Hence, the processing proceeds to step 410 at which a decision is made as to whether or not the F.T position detected at step 404 is the same as the previously detected F.T position.

At this time, with the light beams L1 and L2 respectively emitted from the light-emitting diode 134 and 142 being interrupted again, the processing directly returns from step 410 to step 204 to be in the second-touch waiting state. However, even though the light beams L1 and L2 are interrupted again, if they are not the light beams L1 and L2 respectively emitted from the light-emitting diodes 134 and 142 (that is, the light beams are not interrupted at the same F.T position), the processing proceeds to step 228. At step 228, the establishment of the active area is canceled. Along with this, inverted display of the selection buttons 11 to 14, 21 to 24, and 31 to 34 is canceled together with cancellation of color changing of one of the selection buttons. Furthermore, at step 230, flagging of the flags F1 and F2 is made reset to make the processing return to 204. This state, by the cancellation at step 228, is provided as being the initial stand-by state. Consequently, with the same light beams L1 and L2 remaining interrupted, a processed signal is decided to be an F.T signal at step 210. Subsequent to this, with processing after step 402, an active area is established again and, of the selection buttons 11 to 44, buttons corresponding to the new active area are processed to be displayed with inverted display, with a state being in the second-touch waiting state.

Alternatively, also in the third embodiment, processing, from the initial stand-by state, proceeds through the second-touch waiting state to step 212. From step 212, the processing proceeds so that processing subsequent to step 232 is once carried out. Thus, as shown in FIG. 11, of the selection buttons 11 to 14, 21 to 24, and 31 to 34 in an active area, color changing processing of the selection button 21 is carried out. Along with this, the color of the selection button 11 is changed to a color similar to the color of the selection buttons 12 to 14, 22 to 24, and 31 to 34. This makes the selection button 21 designated as being a determined candidate, with the processing being brought in a determination signal waiting state.

In the determination signal waiting state, when the fingertip is separated from the panel 104 to cancel interruption of the light beams L1 and L2, in the function selecting and inputting program in the third embodiment, because of being provided with neither step 214 nor step 216 as described above, no cancellation is carried out about the establishment of the active area, the inverted display of the selection buttons 11 to 14, 21 to 24, and 31 to 34, and color changing of the selection button 21 (i.e. determined candidate). Thus the active area and the determined candidate are brought in a state of being retained.

In this state, a signal processed at step 206 is neither the F.T signal nor the S.T signal. Thus, a signal provided when the fingertip touches the panel 104 again and any one of the light beams L1 and any one of the light beams L2 are interrupted is taken as an F.T signal. Thus, the processing proceeds from step 210 to step 402. In this state, however, the value of the flag F2 previously substituted by "one" is not reset. Thus, the processing proceeds from step 402 to step 412, at which the S.T position is detected. Next, a decision is made at step 414 as to whether or not the S.T position detected at step 412 is the same as the previously detected S.T position.

When the S.T position detected at step 412 is not the same as the previously detected S.T position, the processing proceeds from step 414 to step 242. At step 242, the color changing of the selection button is canceled. Along with this, at step 228, the establishment of the active area, and the inverted display and the color changed display of the selection buttons 11 to 14, 21 to 24, and 31 to 34 are canceled. Furthermore, at step 230, flagging of the flags F1 and F2 is made reset, becoming an initial stand-by state.

On the other hand, when the S.T position detected at step 412 is the same as the previously detected S.T position, that is, the same light beams L1 and L2 are interrupted again, the processing proceeds from step 414 to step 416. At step 416, the value of a flag F3 is substituted by "one". Then, the processing returns to step 204.

Thereafter, from step 204, the processing proceeds to step 210 through steps 206 and 208. In this case, since the signal immediately before has been taken as an F.T signal and so processed, the processing proceeds to step 212. At step 212, since an electric signal based on interruption of the light beams L1 and L2 was received immediately before the processing thereat, the signal processed at step 206 is taken as an S.T signal. Thus, the processing proceeds to step 232. Here, as described above, even though the fingertip is separated from the panel 104 so as to cancel interruption of the light beams L1 and L2, the flagged F1 and F2 are not made reset. Therefore, the processing proceeds toward step 244. However, unlike the function selecting and inputting programs in the first and second embodiments, the function selecting and inputting program in the third embodiment is provided with processing at step 418 between step 232 and step 244.

At step 418, a decision is made as to whether the value of the flag F3 is "one" or not. In this state, since the value of the flag F3 has been already substituted by "one" at step 416, the processing proceeds to step 420, at which the flag F3 is made reset. Along with this, an elapsed time value T1 of a timer program is made reset. Then, the process proceeds to step 304, at which the timer program is made started before the processing returns to step 204. As described above, in this state, the color changing processing of the selection button 21 is not canceled yet. Also, the establishment of the active area, the inverted display and color changing display of the selection buttons 11 to 14, 21 to 24, and 31 to 34 are not canceled yet. Thus, subsequent to this state, the processing is brought in the determination signal waiting state.

In this way, in the third embodiment, even though a fingertip is separated from the panel 104, a state immediately before is retained. Therefore, even when the fingertip is accidentally separated from the panel 104 in the middle of an operation, the operation can be continued. Moreover in the third embodiment, when searching for a desired one of the selection buttons 11 to 44, or hesitating in making a decision as to which function is to be selected from the selection buttons 11 to 44, from the panel 104, an active area can be prevented from being accidentally changed (scrolling) by separation of the fingertip.

In each of the above embodiments, a constitution is provided in which the controller 90 as an inputting unit is not directly connected to the main body 72. In addition, in the constitution, a signal from the controller 90 is received by the infrared light photodetector unit 80, and the control unit 82 as a controlling unit is made to receive the signal from the unit 80. That is, the constitution is provided such that the control unit 82 as a controlling unit indirectly receives the signal from the controller 90 as an inputting unit. However, a constitution may be provided so that the controller 90 as an inputting unit is connected to the control unit 82 as a controlling unit with a connecting unit such as a cord to allow an electric signal from the controller 90 to be directly received by the control unit 82.

Moreover, in the constitution in each of the above embodiments, the detecting unit is provided with the light-emitting diodes 130 to 134, 142 to 148, and the photodetectors 136 to 140 and 150 to 156. The constitution of the detecting unit, however, is not limited to those in such embodiments, but may be one that can detect where a fingertip as an operating body is positioned on the panel 104. Therefore, for example, a sheet switch constituted as below may be employed as the detecting unit. Such a sheet switch comprises two sheet-like bases on each of which a plurality of bar-like or linear line terminals are arranged in parallel with one another. The sheet-like bases are arranged so that the line terminals thereon face, cross at right angles to and, in a normal condition, are separated from each other. By pressing a portion of one of the sheet-like bases, a line terminal on the one sheet-like base is contacted with a line terminal on the other sheet-like base at a pressed portion, so as to provide continuity. Namely, by pressing one of two bases, a portion of the one base contacts with a portion of the other base, so as to make an electric continuity state between the two bases.

As explained above, in the display operating system according to the present invention, a selectable region in the form of a matrix with the numbers of rows and columns corresponding to those in a matrix determined in a detection region is established on the basis of a position detection signal before selecting a selection element in the selectable region. This allows the numbers of the rows and columns of a plurality of the selection elements to be more than the numbers of the rows and columns in the detection region, with an additional advantage of allowing immediate selection of a desired selection element.

While the present invention has been particularly shown and described with reference to preferred embodiments thereof, it will be understood by those skilled in the art that the foregoing and other changes in form and details can be made therein without departing from the spirit and scope of the present invention.

What is claimed is:

1. A display operating system comprising:
   a detecting section for detecting a plurality of unique positions of an operating body on an operating plane;
   an inputting section for inputting one of a position detection signal and a determined candidate selection signal, the inputting section being provided with the detecting section, and the position detection signal corresponding to only one of said unique positions of the operating body on the operating plane detected by the detecting section, and the determined candidate selection signal corresponding to only one of said unique positions of the operating body on the operating plane detected by the detecting section;
   a monitoring section for displaying a plurality of groups of selection elements displayed on a screen provided thereat wherein a total number of displayed selection elements is greater than a total number of position detection signals that can be generated by said inputting section; and
   a controlling section for controlling such that, of the plurality of groups of selection elements displayed on the screen of the monitoring section, at least one group of selection elements at a position corresponding to the position of the operating body on the operating plane is set to a selectable state on the basis of the received position detection signal, and, of the at least one group of selection elements in the selectable state, one selection element at a position corresponding to the position of the operating body on the operating plane is set to a determined candidate on the basis of the determined candidate selection signal, wherein, if, between a time of reception of the position detection signal and a time of reception of the determined candidate selection signal, the controlling section receives a different position detection signal satisfying a specified condition, a different group of selection elements, from the first selected group of selection element, is set to the selectable state by the controlling section, wherein the different group of selection elements corresponds to the new position of the operating body on the operating plane, such that said inputting section is capable of sequentially generating either a position detection signal and a determined candidate selection signal, or first and second position detection signals.

2. The display operating system as claimed in claim 1, wherein, if, after one of the position detection signal and the determined candidate selection signal has been received, detection of a position of the operating body by the detecting section is canceled, the controlling section maintains a state consequent to the one of the position detection signal and the determined candidate selection signal that has been received and, if a position at which the detecting section next detects the operating body is substantially the same as the position of the operating body before the detection of the position of the operating body by the detecting section was cancelled, the controlling section continues processing from the state consequent to the one of the position detection signal and the determined candidate selection signal that was received.

3. The display operating system as claimed in claim 1, wherein, if, after one of the position detection signal and to determined candidate selection signal has been received, detection of a position of the operating body by the detecting section is canceled, the controlling section maintains a state consequent to the one of the position detection signal and the determined candidate selection signal that has been received and, if a position at which the detecting section next detects the operating body is substantially the same as the position of the operating body before the detection of the position of the operating body by the detecting section was cancelled, the controlling section continues processing from the state consequent to the one of the position detection signal and the determined candidate selection signal tat was received.

4. A display operating system comprising:
- a detecting section for detecting a plurality of unique positions of an operating body on an operating plane, the operating plane including a plurality of unique detection positions corresponding to intersections between a predetermined number of rows and a predetermined number of columns;
- an inputting section for inputting one of a position detection signal and a determined candidate selection signal, the inputting section being provided with the detecting section, and the position detection signal corresponding to only one of said plurality of unique positions of the operating body on the operating plane detected by the detecting section, and the determined candidate selection signal corresponding to only one of said plurality of unique positions of the operating body on the operating plane detected by the detecting section;
- a monitoring section for displaying a plurality of selection elements displayed on a screen provided thereat, the plurality of selection elements being structured of one of more rows as the predetermined number of rows or more columns as the predetermined number of columns; and
- a controlling section for controlling such that, of the plurality of selection elements displayed on the screen of the monitoring section, one group of selection elements at a position corresponding to the first position of the operating body on the operating plane is set to a selectable state on the basis of the received position detection signal, and, of the group of selection elements in the selectable state, a selection element at a position corresponding to the second position of the operating body on the operating plane is set to a determined candidate on the basis of the determined candidate selection signal.

5. The display operating system as claimed in claim 4, wherein, of the plurality of selection elements displayed on the screen of the monitoring section, the controlling section sets selection elements, which are structured of a number of rows equal to the predetermined number of rows and a number of columns equal to the predetermined number of columns, to the selectable state on the basis of the received position detection signal.

6. The display operating system as claimed in claim 5, wherein, after the selection elements which are structured of the numbers of row equal to the predetermined number of rows and the number of columns equal to the predetermined number of columns have been set to the selectable state, the controlling section sets one of the selection elements that have been set to the selectable state as the determined candidate on the basis of the determined candidate selection signal.

7. The display operating system as claimed in claim 4, wherein, if the selection element at the position corresponding to the second position of the operating body on the operating plane is adjacent to a selection element other than the at least one selection element set to the selectable state and a predetermined condition is satisfied, then the controlling section sets different at least one selection element to the selectable state.

8. The display operating system as claimed in claim 7, wherein the predetermined condition is that the operating body is detected at the second position on the operating plane for at least a predetermined duration.

9. The display operating system as claimed in claim 4, wherein, if, after one of the position detection signal and the determined candidate selection signal has been received, detection of a position of the operating body by the detecting section is canceled, the controlling section maintains the at least one selection element in the selectable state until the operating body is next detected by the detecting section.

10. The display operating system as claimed in claim 9, wherein, if, after the detection of a position of the operating body by the detecting section has been canceled, a position at which the operating body is next detected by the detecting section is substantially the same as the position of the operating body before the detection of the position of the operating body by the detecting section was cancelled, the controlling section maintains the at least one selection element in the selectable state.

11. A display operating system comprising:
- a detecting section for detecting a plurality of unique positions of an operating body on an operating plane;
- an inputting section for inputting one of a position detection signal and a determined candidate selection signal, the position detection signal corresponding to only one of said unique positions of the operating body on the operating plane detected by the detecting section and the determined candidate selection signal corresponding to only one of said unique positions of the operating body on the operating plane detected by the detecting section;
- a monitoring section for displaying a plurality of groups of selection elements displayed on a screen provided thereat where a total number of displayed selection elements is greater than a total number of position detection signals that can be generated by said inputting section; and
- a controlling section for controlling such that,
  - in said plurality of groups selection elements displayed on the screen of the monitoring section, on the basis of the received position detection signal, one group of selection elements which corresponds to the position of the operating body on the operating plane is set to an operable state among different groups of selection elements, the group comprising at least one row and at least one column to include a plurality of selection elements, and
  - among the selection elements in said one group of selection elements set to operable state, one selection element at a position corresponding to the position of the operating body on the operating plane is set to a determined candidate on the basis of the received determined candidate selection signal.

12. The display operating system as claimed in claim 11, wherein each of the groups of selection elements has a number of rows that is the same as that of a number of rows in the operating panel and a number of columns that is the same as that of a number of columns in the operating panel,
- said one group of selection elements is set to the operable state such that one of selection elements included therein can be set to the determined candidate,
- said one group of selection elements is set to the operable state on the basis of the received position detection signal corresponding to a first position of the operating body on the operating plane, and
- said one selection element of said one group is set to the determined candidate on the basis of the received determined candidate selection signal corresponding to a second position of the operating body on the operating plane, which is received after receiving the position detection signal corresponding to the first position of the operating body on the operating plane.

* * * * *